US012372289B2

(12) United States Patent
Owens et al.

(10) Patent No.: US 12,372,289 B2
(45) Date of Patent: Jul. 29, 2025

(54) TEMPERATURE CONTROL CART FOR A PAYLOAD

(71) Applicant: VESTURE LLC, Charlotte, NC (US)

(72) Inventors: Byron Craig Owens, Asheboro, NC (US); A. Scott Queen, Asheboro, NC (US); Reyad I. Sawafta, Greensboro, NC (US); Brian S. Chapman, Greensboro, NC (US); Venu Gopal R. Kuturu, Greensboro, NC (US); John A. Gerig, Asheboro, NC (US); Christopher M. Lee, Asheboro, NC (US); Rami M. Saeed, Greensboro, NC (US)

(73) Assignee: VESTURE LLC, Asheboro, NC (US)

( * ) Notice: Subject to any disclaimer, the term of this patent is extended or adjusted under 35 U.S.C. 154(b) by 94 days.

(21) Appl. No.: 17/797,222

(22) PCT Filed: Feb. 4, 2021

(86) PCT No.: PCT/US2021/016609
§ 371 (c)(1),
(2) Date: Aug. 3, 2022

(87) PCT Pub. No.: WO2021/158787
PCT Pub. Date: Aug. 12, 2021

(65) Prior Publication Data
US 2023/0061277 A1 Mar. 2, 2023

Related U.S. Application Data

(60) Provisional application No. 62/969,732, filed on Feb. 4, 2020.

(51) Int. Cl.
*F25D 11/00* (2006.01)
*A47J 39/00* (2006.01)
*F25D 17/02* (2006.01)

(52) U.S. Cl.
CPC ............. *F25D 11/003* (2013.01); *A47J 39/00* (2013.01); *F25D 11/006* (2013.01); *F25D 17/02* (2013.01);
(Continued)

(58) Field of Classification Search
CPC ...... F25D 11/003; F25D 11/006; F25D 17/02; F25D 2400/02; F25D 2400/38; F25D 9/00
See application file for complete search history.

(56) References Cited

U.S. PATENT DOCUMENTS 2,061,427 A * 11/1936 King ................. F25D 17/02
62/437
5,247,807 A * 9/1993 Jarman ............. A47F 3/0408
62/227
(Continued)

FOREIGN PATENT DOCUMENTS

WO WO-2009143342 A2 * 11/2009 ............ A47J 39/003

*Primary Examiner* — Lionel Nouketcha
(74) *Attorney, Agent, or Firm* — TILLMAN WRIGHT, PLLC; Chad D. Tillman

(57) ABSTRACT

Various aspects and embodiments of a temperature control cart (100) are disclosed. The temperature control cart (100) comprises a top portion (116) with one or more wells (202), wherein the one or more wells (202) is operable to receive one or more pans (102). The wells (202) are configured to hold pans (102), wherein the pans (102) often contain a payload, such as food or medicine, that requires temperature control. Further, the top portion (116) is disposed in a tank (108) that contains phase change material (PCM). In another aspect, a method for controlling temperature of a payload is disclosed. A temperature control cart (100) is further provided with one or more heat exchangers. Wherein the one or more heat exchangers circulate a heat exchange fluid, thereby heating or cooling the PCM disposed in the tank (Continued)

(108) of the temperature control cart (100) to above or below a transition temperature of the PCM.

13 Claims, 9 Drawing Sheets

(52) U.S. Cl.
CPC ...... *F25D 2400/02* (2013.01); *F25D 2400/38* (2013.01)

(56) References Cited

U.S. PATENT DOCUMENTS

| | | | | |
|---|---|---|---|---|
| 5,408,845 | A * | 4/1995 | Forshaw | F25D 31/007 62/438 |
| 6,044,650 | A | 4/2000 | Cook et al. | |
| 6,145,333 | A * | 11/2000 | Richmond | A47F 3/0452 219/385 |
| 6,397,618 | B1 * | 6/2002 | Chu | F28D 15/0275 257/E23.088 |
| 9,845,988 | B2 * | 12/2017 | Shuntich | F25D 3/08 |
| 10,295,268 | B2 | 5/2019 | Schryver et al. | |
| 2008/0047296 | A1 * | 2/2008 | Helmer | F25D 3/08 62/457.7 |
| 2008/0087037 | A1 * | 4/2008 | Rapaz | F25D 3/08 62/457.2 |

* cited by examiner

700

TEMPERATURE CONTROL CART FOR A PAYLOAD

CROSS-REFERENCE TO RELATED APPLICATIONS

The present patent application claims the benefit and priority of U.S. Provisional Patent Application No. 62/969,732, filed on Feb. 4, 2020, titled "TEMPERATURE CONTROL CART FOR FOOD," the contents of which is hereby incorporated by reference in its entirety. The appendix from the provisional is included as the appendix to the specification, which is incorporated by reference.

FIELD

The present disclosure relates to temperature control carts systems and methods, and in particular, to payload temperature control in areas food and medicine, comprising phase change materials (PCMs).

BACKGROUND

Temperature control is a major concern in the food industry, including the prepared food or restaurant industry. Restaurants of various kinds must prepare, serve, and store food under many different conditions. For example, food preparation often occurs in kitchens having higher average temperatures and/or relative humidity than other portions of a restaurant, such as the dining area. In addition, restaurants and others in the food industry handle, store, and/or display many different types of food, such as raw meat or raw vegetables. Further, governmental entities tend to regulate the handling of food based on food type. For example, the United States Public Health Service and Food and Drug Administration releases a Food Code manual for safeguarding public health and ensuring food is unadulterated and honestly presented when offered to consumers. The Food Code manual explicitly lists improper holding temperatures as a key risk factor to foodborne illness pain, which includes pain and suffering, reduced productivity, and medical costs that are estimated to range from $10 to $83 billion U.S. dollars. Moreover, regulations with respect to certain food types have recently become significantly more restrictive in certain jurisdictions, with the result that various types of food must be prepared and otherwise handled within a narrower temperature range and/or at lower temperatures than previously.

Existing systems and devices for maintaining desired temperatures suffer from one or more disadvantages. For example, some systems and devices require the use of large quantities of ice. The use of ice can lead to unsanitary and otherwise hazardous conditions, especially when replacing melted ice with fresh, unmelted ice. Other systems and devices require the use of circulating air and/or compressors near food preparation areas, which can likewise lead to unsafe conditions. Moreover, some existing systems and devices fail to maintain food-preparation surfaces or other areas within regulated temperature ranges for the required time periods, once again leading to decreased food safety and, in many instances, increased waste. For these reasons and others, there remains a need for improved temperature control for food preparation, storage, display, and service, including in restaurants.

Further, the medical industry has a long sought need to control temperatures of medicines, blood products, and devices when stationery and in transport on a cart. Often times medical carts may hold a variety of products and devices that require thermal regulation. Sometimes such thermal regulation cannot involve mechanical means, further increasing the challenge of transport. In other instances, the cart may be required to fit a particular dimension to navigate operating parameters within a hospital, hospital transport (helicopter, vehicle), or medicinal shipping. For these reasons and others, there remains a need for improved temperature control carts for use with medical applications.

SUMMARY

In one aspect, a temperature control cart is disclosed. The temperature control cart, in the example, comprises a top portion with one or more wells, wherein the one or more wells is operable to receive one or more pans. The wells are concave wells for holding pans, wherein the pans often contain a payload, in this example the payload is food that requires temperature control. In other examples the payload may be a medicine, such as a vaccine or insulin, of other medicine or biological or chemical medicinal product that requires temperature control. Further, in the example, the top portion, with the one or more wells and one or more pans is disposed in a tank that resides beneath the top portion. Wherein the phase change material (PCM) is disposed within the tank. Further, the PCM material disposed within the tank may be in contact with the underside or bottom of the top portion.

In another aspect, a temperature control cart is disclosed, wherein the temperature control cart comprises one or more heat exchangers disposed in a tank wherein the PCM is located. In the example, the temperature control cart comprises a top portion wherein one or more wells, and one or more pans that fit into the wells are configured. The bottom of the top portion is disposed within a tank filled with PCM. The heat exchanger assembly is configured to integrate with the temperature control cart and the heat exchanging coils are disposed within the PCM in the tank.

In one aspect, a method for controlling temperature of a payload is disclosed. In the example the method comprises providing a temperature control cart, wherein the temperature control cart comprises a top portion, wells, pans, a tank, and PCM disposed within the tank. Next, heating or cooling the PCM disposed in the tank of the temperature control cart to above or below a transition temperature of the PCM. Then placing the payload on an exterior work surface of the temperature control cart, wherein thermal energy is transferred from the payload to the PCM or from the PCM and to the payload, thereby controlling the temperature of the payload.

In another aspect, a method for controlling temperature of a payload is disclosed. In the example, a temperature control cart, having a top portion, wells, pans, a tank, and PCM disposed within the tank is further provided with one or more heat exchangers. Wherein the one or more heat exchangers circulate a heat exchange fluid, thereby heating or cooling the PCM disposed in the tank of the temperature control cart to above or below a transition temperature of the PCM. Further, then placing a payload on an exterior surface, such as a pan, wherein the thermal energy is transferred from the payload to the PCM or from the PCM and to the payload, thereby controlling the temperature of the payload.

BRIEF DESCRIPTION OF THE DRAWINGS

The foregoing summary, as well as the following detailed description of illustrative embodiments, is better understood with the following appended drawings. For the purposes of illustrating the embodiments, there are shown in the drawings example constructions of the embodiments; however, the embodiments are not limited to the specific systems, apparatus, and methods disclosed. In the drawings.

DETAILED DESCRIPTION

Figure 1:
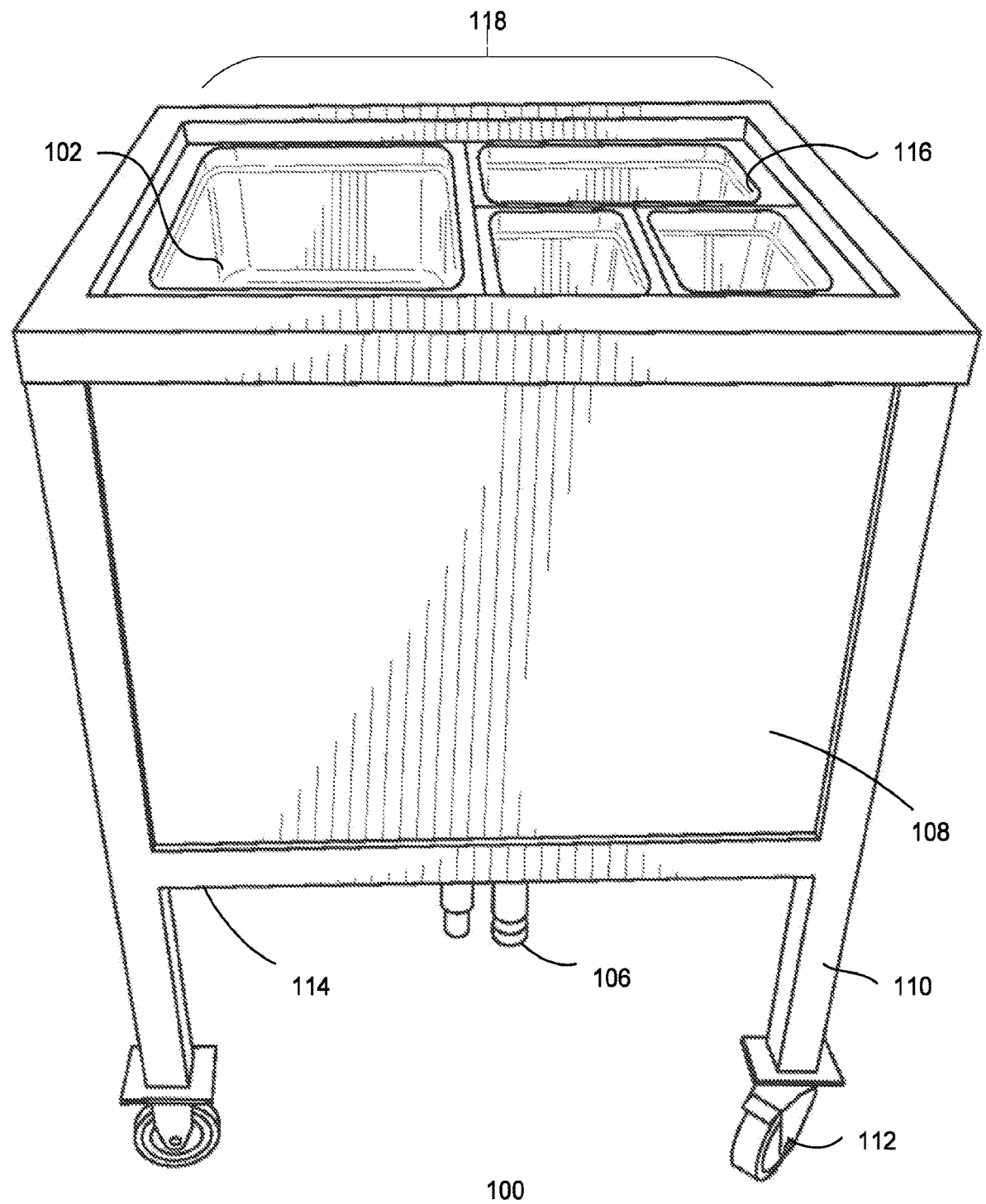
FIG. 1 illustrates a perspective view of an example embodiment of a temperature control cart.

Implementations and embodiments described herein can be understood more readily by reference to the following detailed description, drawings, and examples. Elements, apparatus, and methods described herein, however, are not limited to the specific implementations presented in the detailed description, drawings, and examples. It should be recognized that these implementations are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum of 1.0 or more and ending with a maximum value of 10.0 or less, e.g., 1.0 to 5.3, or 4.7 to 10.0, or 3.6 to 7.9. Similarly, as will be clearly understood, a stated range of "1 to 10" should be considered to include any and all subranges beginning with a minimum of 1 or more and ending with a maximum value of 10 or less, e.g., 1 to 6, or 7 to 10, or 3.6 to 7.9.

All ranges disclosed herein are also to be considered to include the end points of the range, unless expressly stated otherwise. For example, a range of "between 5 and 10," "from 5 to 10," or "5-10" should generally be considered to include the end points of 5 and 10.

I. Examples

In one aspect, temperature control carts are described herein which, in some embodiments, provide one or more advantages compared to other temperature control solutions, including for the preparation, storage, and/or service of food. For example, in some cases, a temperature control cart described herein can help maintain temperature at a wide variety of set points, relevant to a wide variety of food types. In addition, in some instances, a cart described herein can be used for maintaining either a cold temperature (e.g., below room temperature or below 5° C.) or a hot temperature (e.g., above room temperature or above 35° C.), as opposed to being limited to only hot and cold applications. Moreover, in some embodiments, a cart described herein can maintain a desired temperature or temperature range (of a surface of the cart and/or of a payload, such as food or medical products/supplies, in contact with the surface) even without active heating or cooling (i.e., when a cooling or heating device such as a compressor is off or otherwise not in thermal communication with one or more portions of the cart). In other words, carts described herein can maintain a desired set point for many hours (up to 8 hours, up to 12 hours, up to 16 hours, up to 20 hours, or up to 24 hours, or from 6 to 24 hours, 8 to 20 hours, or 10-16 hours), with no active heating or cooling. Instead, the carts can rely on the "passive" cooling or heating provided by the PCM of the cart, alone or in combination with circulation of a heat transfer fluid through the cart in a manner described herein. In addition, in some cases, a cart described herein can be stationary or portable (e.g., by rolling on wheels). Wherein being portable allows the cart to be moved from location to location, through wheels, rollers, casters, or by being located on movable objects, or otherwise transported from location to location.

Temperature control carts described herein can be used in restaurants, catering, food trucks, food transport, medical supply storage and/or transport, and other applications. Further, carts described herein can be used to maintain the temperature of one or more of the following: chicken, other meats, milks, cheese, salad bars, vegetables, fruits, and any other food product that requires maintenance of temperature ranges.

Further, temperature control carts described herein can also be used in hospitals to store, prepare, and transport medical supplies or products. Examples include the use in hospitals, medical transport, shipping, storage, medical storage, medical preparation, and medical delivery. Further, carts described herein can be used to maintain the temperature of one or more of the following: vaccines, medications, blood, blood products (plasma), medical devices, transplant organs, and other biological or chemical medical products and or devices that require maintenance of temperature ranges.

Additional features of some preferred embodiments of carts described herein include the following (where it is to be understood that the specific enumerated features can be combined in any combination not inconsistent with the objectives of the present disclosure, ranging from only one of the following features to all of the following features, or any intermediate combination thereof): adjustable height legs; all metal construction inside the tank of the cart; metal to metal heat transfer during use of the cart for temperature control; inclusion of a heat exchanger module for thermal distribution; an "active" frame that includes piping or tubes for circulating heat exchange fluid, which can eliminate excess piping; quick disconnects that allow for easy cleaning and help make the cart portable; a removable top portion; unit portable; tamper resistant lock mechanism; and reverse live well submersed in thermal energy storage material (e.g., phase change material, PCM).

In one example, a temperature control cart or system described herein comprises a top portion comprising one or more wells or receptacles or compartments operable to receive one or more pans (e.g., for food preparation, storage, display, or service). The system or cart also comprises a tank or vat disposed beneath the top portion, and one or more phase change materials (PCMs) disposed in the tank. Additionally, the PCM or PCMs is/are in thermal contact with the wells of the top portion. For example, as described further herein, the PCM can fill the tank to a level sufficient to contact the bottom of the wells (that is, from the bottom side of the top portion, opposite the exterior environment or working surface of the cart). In this manner, the wells can be "immersed" or partially immersed in the tank or vat of PCM.

Moreover, in some preferred embodiments, there is no water or ice formulations, that is water and ice formulations that lack any other material, such as a salt, disposed in the wells beneath the pans. In addition, in some preferred embodiments, the PCM of the system or cart is not ice. Thus, in some implementations, a system, cart, or method described herein is ice-free, wherein the embodiments are free from water ice. Ice-free or water ice is ice formed by water, as opposed to ice formed by other substances, such as PCM.

In some cases, a system or cart described herein further comprise one or more heat exchangers disposed in (and/or in thermal contact with) the PCM in the tank. The heat exchangers can be plate-type heat exchangers, conduit-type heat exchangers, or any other type of heat exchanger not inconsistent with the objectives of the present disclosure.

Moreover, in some implementations, a system or cart described herein also comprises a frame supporting and/or containing the tank and the top portion. The frame may be a metal frame having posts and cross supports, or side walls and a bottom. The form of the frame is not particularly limited. It is also possible for the tank itself to serve as the frame.

A system or cart described herein, in some embodiments, further comprises one or more thermal exchange conduits disposed within the frame (if the frame is present), or within side walls of the tank. The thermal exchange conduits can have any structure and be formed from any material not inconsistent with the objectives of the present disclosure. For example, in some instances, a plurality of copper conduits or tubes are disposed in the frame or within side walls of the tank. The conduits can form a single "loop" for flow of a heat exchange fluid disposed in the conduits. A plurality of distinct or flow paths for heat exchange fluid may also be used.

Moreover, in some cases, a system or cart described herein further comprises a circulation pump for circulating a heat exchange fluid within the thermal exchange conduits. In some such instances, the circulation pump is disposed beneath the tank (e.g., resting on or supported by the frame of the cart or system, if a separate frame is present). Additionally, in some embodiments, a system or cart described herein comprises a cooling unit and/or heating unit for heating or cooling the heat exchange fluid, such as a refrigeration unit or other source of so-called active or mechanical heating or cooling the heat exchange fluid, such as a unit having a compressor, condenser, evaporator, and/or refrigerant. In some cases, the refrigeration unit (or other cooling unit) or heating unit is part of the cart, such as by being disposed on the frame itself (e.g., below the tank). Alternatively, in other embodiments, the refrigeration (or other cooling) or heating unit is not part of the cart itself, such as by being disposed not on the frame or otherwise attached to the tank or top portion (except through a hose or other conduit). In such instances, the refrigeration (or cooling) unit or the heating unit of the system can be "remote" from the cart itself and can instead be placed in another area (e.g., on a special shelf or wall mount, or in a different room) and connected to the cart (or to a thermal exchange conduit of the cart) only by piping or hoses. In this manner, the heat exchange fluid circulating through the cart can be actively heated or cooled "remotely", away from the cart (e.g., during hours when the cart is not in active use for food processing, storage, display or service). It is further to be understood that such active heating or cooling can be used to "recharge" the PCM of the cart. Namely, the PCM can be returned to its desired phase (e.g., a frozen or solid or low temperature phase) before using the system or cart to control the temperature of food (e.g., by absorbing thermal energy from the food to keep the food at a low temperature or within a safe or mandated temperature range).

II. Compositions

The PCM component of a cart described herein can comprise any PCM or combination of PCMs not inconsistent with the objectives of the present disclosure. Moreover, the PCM (or combination of PCMs) used in a particular instance can be selected based on a relevant operational temperature range for the specific end use or application. For example, in some cases, the PCM has a phase transition temperature (e.g., a melting temperature or freezing temperature) within a range suitable for maintaining a working surface at 40-45° F. (e.g., at 40° F.) or at another temperature suitable for use with a specific food type (such as raw chicken) or for a desired temperature framework for maintaining food or produce at frozen, refrigerated, warmed, or hot (such as at or above 60° C.) temperatures. As understood by one having ordinary skill in the art, a phase transition temperature described herein (such as a phase transition temperature of "X" ° C., where X may be −20° C., for example) may be represented as a normal distribution of temperatures centered on X° C. In addition, as understood by one having ordinary skill in the art, a PCM described herein can exhibit thermal hysteresis, such that the PCM exhibits a phase change temperature difference between the "forward" phase change and the "reverse" phase change (e.g., a solidification temperature that is different from the melting temperature). In other instances, the PCM has a phase transition temperature suitable for maintaining a temperature close to room temperature. Additionally, in some implementations, one or more PCMs may be selected to maintain a temperature suitable for storage or transport of medical supplies, diagnostic kits, vaccines, biological materials or the like. In some embodiments, the PCM has a phase transition temperature within one of the ranges of Table 1 below.

TABLE 1

Sample of phase transition temperature ranges for PCMs at 1 atm.
Sample of Phase Transition Temperature Ranges

| |
| --- |
| 110-115° C. |
| 90-105° C. |
| 75-95° C. |
| 35-80° C. |
| 40-60° C. |
| 20-25° C. |
| 15-35° C. |
| 15-25° C. |

TABLE 1-continued

Sample of phase transition temperature ranges for PCMs at 1 atm.
Sample of Phase Transition Temperature Ranges 10-15° C.
4-10° C.
2-8° C.
2-6° C.
−5° C. to 0° C.
−25° C. to −5° C.
−30° C. to −10° C.
−55° C. to −30° C.
−75° C. to −50° C.
−80° C. to −65° C.

A phase transition temperature, in some embodiments, is between about −80° C. and about 100° C. at 1 atm or between about −40° C. and about 40° C. at 1 atm. In some embodiments, a phase transition temperature is between about −50° C. and about 0° C. at 1 atm, between about −20° C. and about 0° C., or between about −25° C. and about −15° C. at 1 atm. In some embodiments, a phase transition temperature is between about 0° C. and about 70° C. at 1 atm or between about −4° C. and about 40° C. at 1 atm. In other embodiments, a phase transition temperature is between about 30° C. and about 50° C. at 1 atm or between about 35° C. and about 45° C. at 1 atm. In some embodiments, a phase transition temperature is between about 450° C. and about 550° C. at 1 atm, about 300° C. and about 550° C. at 1 atm, about 70° C. and about 100° C. at 1 atm, about 60° C. and about 80° C. at 1 atm, about 40° C. and about 60° C. at 1 atm, about 40° C. and about 50° C. at 1 atm, about 16° C. and about 23° C. at 1 atm, about 16° C. and about 18° C. at 1 atm, about 15° C. and about 20° C. at 1 atm, about 4° C. and about 10° C. at 1 atm, about 6° C. and about 8° C. at 1 atm, about −40° C. and about −10° C. at 1 atm, or between about −4° C. and about 40° C. at 1 atm. In other embodiments, a phase transition temperature is between about 30° C. and about 50° C. at 1 atm or between about 35° C. and about 45° C. at 1 atm.

Further, a PCM of a cart described herein can either absorb or release energy using any phase transition not inconsistent with the objectives of the present disclosure. For example, the phase transition of a PCM described herein, in some embodiments, comprises a transition between a solid phase and a liquid phase of the PCM, or between a solid phase and a mesophase of the PCM. A mesophase, in some cases, is a gel phase. Thus, in some instances, a PCM undergoes a solid-to-gel transition. A solid-to-solid transition is also possible.

Moreover, in some cases, a PCM or mixture of PCMs has a phase transition enthalpy of at least about 50 kJ/kg or at least about 100 kJ/kg. In other embodiments, a PCM or mixture of PCMs has a phase transition enthalpy of at least about 150 kJ/kg, at least about 200 kJ/kg, at least about 300 kJ/kg, or at least about 350 kJ/kg. In some instances, a PCM or mixture of PCMs has a phase transition enthalpy between about 50 kJ/kg and about 350 kJ/kg, between about 100 kJ/kg and about 350 kJ/kg, between about 100 kJ/kg and about 220 kJ/kg, or between about 100 kJ/kg and about 250 kJ/kg.

In addition, a PCM of a cart described herein can have any composition not inconsistent with the objectives of the present disclosure. In some embodiments, for instance, a PCM comprises an inorganic composition. In other cases, a PCM comprises an organic composition. In some instances, a PCM comprises a salt hydrate. Suitable salt hydrates include, without limitation, $KF \cdot 4H_2O$, $Mn(NO_3)_2 \cdot 6H_2O$, $CaCl_2 \cdot 6H_2O$, $CaBr_2 \cdot 6H_2O$, $Li(NO_3) \cdot 6H_2O$, $Na_2SO_4 \cdot 10H_2O$, $Na_2CO_3 \cdot 10H_2O$, $Na_2HPO_4 \cdot 12H_2O$, $Zn(NO_3)_2 \cdot 6H_2O$, $Ca(NO_3)_2 \cdot 3H_2O$, $Na(NO_3)_2 \cdot 6H_2O$, $Zn(NO_3)_2 \cdot 2H_2O$, $FeCl_3 \cdot 2H_2O$, $Co(NO_3)_2 \cdot 6H_2O$, $Ni(NO_3)_2 \cdot 6H_2O$, $MnCl_2 \cdot 4H_2O$, $CH_3COONa \cdot 3H_2O$, $LiC_2H_3O_2 \cdot 2H_2O$, $NaCl \cdot 2H_2O$, $MgCl_2 \cdot 4H_2O$, $MgCl_2 \cdot 8H_2O$, $MgCl_2 \cdot 12H_2O$, $NaOH \cdot H_2O$, $Cd(NO_3)_2 \cdot 4H_2O$, $Cd(NO_3)_2 \cdot 1H_2O$, $Fe(NO_3)_2 \cdot 6H_2O$, $NaAl(SO_4)_2 \cdot 12H_2O$, $FeSO_4 \cdot 7H_2O$, $Na_3PO_4 \cdot 12H_2O$, $Na_2B_4O_7 \cdot 10H_2O$, $Na_3PO_4 \cdot 12H_2O$, $LiCH_3COO \cdot 2H_2O$, $NH_4Cl \cdot 3H_2O$, anhydrous KCl and/or hydrates of KCl, $(NH_4)_2SO_4$ hydrates, $MgSO_4 \cdot 12H_2O$, $MgSO_4 \cdot 7H_2O$, $Na_2SO_4 \cdot 10H_2O$, $Na_2SO_4 \cdot 7H_2O$, $K_2SO_4$ hydrates, $(NH_4)_2CO_3H_2O$, and/or mixtures thereof. Other salt hydrates not specifically enumerated herein above may also be used. The PCM may also be water. Alternatively, in some embodiments, the PCM is not water. In some embodiments, a PCM or combination of PCMs may comprise or be formed from a combination of one or more materials selected from the group consisting of the contents of Table II. As used in Table II and the remainder of this disclosure, OAc refers to an acetate ion ($CH_3COO^-$ or $C_2H_3O_2^-$).

TABLE II

Materials which may be used to form one or more PCM components.

| | | | | |
|---|---|---|---|---|
| $K_2CO_3$ | $K_2HPO_4$ | $NiSO_4$ | $Sr(NO_3)_2$ | $CuCl_2$ |
| $KHCO_3$ | $NH_4F$ | KCl | $NH_4Cl$ | $CaMg(OAc)_4$ |
| K(OAc) | $(NH_4)_2SO_4$ | $Ba(OH)_2$ | $Mg(NO_3)_2$ | $MgCl_2$ |
| $CaCl_2$ | $FeCl_3$ | NaBr | LiCl | $Sr(OH)_2$ |
| $FeSO_4$ | NaF | LiOH | $BaCl_2$ | $ZnSO_4$ |
| $Mg(OH)_2$ | $Na_2CO_3$ | $KNO_3$ | $Ca(OH)_2$ | $Na_2SO_4$ |
| $KMg(OAc)_3$ | NaCl | $CuSO_4$ | $NaMg(OAc)_3$ | KOH |
| $NaH_2PO_4$ | $ZnCl_2$ | $Ca(NO_3)_2$ | Li(OAc) | $CaBr_2$ |
| KF | $Li_2SO_4$ | $NaNO_3$ | $CaCl_2$ | $Al(NO_3)_3$ |
| Na(OAc) | NaOH | $MgSO_4$ | $K_2SO_4$ | $Na_2HPO_4$ |
| $MnSO_4$ | $Zn(NO_3)_2$ | $Mg(OAc)_2$ | $NH_4NO_3$ | $MgBr_2$ |
| $Na_3PO_4$ | | | | |

In other embodiments, a PCM comprises a fatty acid. A fatty acid, in some embodiments, can have a C4 to C28 aliphatic hydrocarbon tail. Further, in some cases, the hydrocarbon tail is saturated. Alternatively, in other instances, the hydrocarbon tail is unsaturated. In some embodiments, the hydrocarbon tail can be branched or linear. Non-limiting examples of fatty acids suitable for use in some embodiments described herein include caprylic acid, capric acid, lauric acid, myristic acid, palmitic acid, stearic acid, arachidic acid, behenic acid, lignoceric acid, and cerotic acid. In some cases, a PCM described herein comprises a combination, mixture, or plurality of differing fatty acids. For reference purposes herein, it is to be understood that a chemical species described as a "Cn" species (e.g., a "C4" species or a "C28" species) is a species of the identified type that includes exactly "n" carbon atoms. Thus, a C4 to C28 aliphatic hydrocarbon tail refers to a hydrocarbon tail that includes between 4 and 28 carbon atoms.

In some instances, a PCM comprises an alkyl ester of a fatty acid. Any alkyl ester not inconsistent with the objectives of the present disclosure may be used. For instance, in some embodiments, an alkyl ester comprises a methyl ester, ethyl ester, isopropyl ester, butyl ester, or hexyl ester of a fatty acid described herein. In other implementations, an alkyl ester comprises a C2 to C6 ester alkyl backbone or a C6 to C12 ester alkyl backbone. In some embodiments, an alkyl ester comprises a C12 to C28 ester alkyl backbone. Further, in some cases, a PCM comprises a combination, mixture, or plurality of differing alkyl esters of fatty acids.

Non-limiting examples of alkyl esters of fatty acids suitable for use in some embodiments described herein include methyl laurate, methyl myristate, methyl palmitate, methyl stearate, methyl palmitoleate, methyl oleate, methyl linoleate, methyl docosahexanoate, methyl ecosapentanoate, ethyl laurate, ethyl myristate, ethyl palmitate, ethyl stearate, ethyl palmitoleate, ethyl oleate, ethyl linoleate, ethyl docosahexanoate, ethyl ecosapentanoate, isopropyl laurate, isopropyl myristate, isopropyl palmitate, isopropyl stearate, isopropyl palmitoleate, isopropyl oleate, isopropyl linoleate, isopropyl docosahexanoate, isopropyl ecosapentanoate, butyl laurate, butyl myristate, butyl palmitate, butyl stearate, butyl palmitoleate, butyl oleate, butyl linoleate, butyl docosahexanoate, butyl ecosapentanoate, hexyl laurate, hexyl myristate, hexyl palmitate, hexyl stearate, hexyl palmitoleate, hexyl oleate, hexyl linoleate, hexyl docosahexanoate, and hexyl ecosapentanoate.

In some embodiments, a PCM or PCM component comprises a fatty alcohol. Any fatty alcohol not inconsistent with the objectives of the present disclosure may be used. For instance, a fatty alcohol, in some cases, can have a C4 to C28 aliphatic hydrocarbon tail. Further, in some embodiments, the hydrocarbon tail is saturated. Alternatively, in other implementations, the hydrocarbon tail is unsaturated. The hydrocarbon tail can also be branched or linear. Non-limiting examples of fatty alcohols suitable for use in some embodiments described herein include capryl alcohol, pelargonic alcohol, capric alcohol, undecyl alcohol, lauryl alcohol, tridecyl alcohol, myristyl alcohol, pentadecyl alcohol, cetyl alcohol, heptadecyl alcohol, stearyl alcohol, nonadecyl alcohol, arachidyl alcohol, heneicosyl alcohol, behenyl alcohol, lignoceryl alcohol, ceryl alcohol, and montanyl alcohol. In some cases, a PCM comprises a combination, mixture, or plurality of differing fatty alcohols.

In some instances, a PCM or PCM component comprises a fatty carbonate ester, sulfonate, or phosphonate. Any fatty carbonate ester, sulfonate, or phosphonate not inconsistent with the objectives of the present disclosure may be used. In some embodiments, a PCM comprises a C4 to C28 alkyl carbonate ester, sulfonate, or phosphonate. In some embodiments, a PCM comprises a C4 to C28 alkenyl carbonate ester, sulfonate, or phosphonate. In some embodiments, a PCM comprises a combination, mixture, or plurality of differing fatty carbonate esters, sulfonates, or phosphonates. In addition, a fatty carbonate ester described herein can have two alkyl or alkenyl groups described herein or only one alkyl or alkenyl group described herein.

Moreover, in some embodiments, a PCM or PCM component comprises a paraffin. Any paraffin not inconsistent with the objectives of the present disclosure may be used. In some embodiments, a PCM comprises n-dodecane, n-tridecane, n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, n-octacosane, n-nonacosane, n-triacontane, n-hentriacontane, n-dotriacontane, n-tritriacontane, and/or mixtures thereof.

In addition, in some embodiments, a PCM or PCM component comprises a polymeric material. Any polymeric material not inconsistent with the objectives of the present disclosure may be used. Non-limiting examples of suitable polymeric materials for use in some embodiments described herein include thermoplastic polymers (e.g., poly(vinyl ethyl ether), poly(vinyl n-butyl ether) and polychloroprene), polyethylene glycols (e.g., CARBOWAX® polyethylene glycol 400, CARBOWAX® polyethylene glycol 600, CARBOWAX® polyethylene glycol 1000, CARBOWAX® polyethylene glycol 1500, CARBOWAX® polyethylene glycol 4600, CARBOWAX® polyethylene glycol 8000, and CARBOWAX® polyethylene glycol 14,000), and polyolefins (e.g., lightly crosslinked polyethylene and/or high density polyethylene).

Additional non-limiting examples of phase change materials suitable for use in some embodiments described herein include BioPCM materials commercially available from Phase Change Energy Solutions (Asheboro, North Carolina), such as BioPCM-(−8), BioPCM-(−6), BioPCM-(−4), BioPCM-(−2), BioPCM-4, BioPCM-6, BioPCM 08, BioPCM-Q12, BioPCM-Q15, BioPCM-Q18, BioPCM-Q20, BioPCM-Q21, BioPCM-Q23, BioPCM-Q25, BioPCM-Q27, BioPCM-Q30, BioPCM-Q32, BioPCM-Q35, BioPCM-Q37, BioPCM-Q42, BioPCM-Q49, BioPCM-55, BioPCM-60, BioPCM-62, BioPCM-65, BioPCM-69, and others.

It is further to be understood that a cart described herein can comprise a plurality of differing PCMs, including differing PCMs of differing types. Any mixture or combination of differing PCMs not inconsistent with the objectives of the present disclosure may be used. In some embodiments, for example, a cart comprises one or more PCMs comprising fatty acids and one or more fatty alcohols. Further, as described above, a plurality of differing PCMs, in some cases, is selected based on a desired phase transition temperature and/or latent heat of the mixture of PCMs. In certain implementations, a PCM comprises multiple PCM components. As discussed above, a PCM may have one or multiple components comprised or formed from a salt or salt hydrate, including inorganic and/or organic salts. Further, in some embodiments, a PCM has a first component which is an organic component, and a second component which may be an organic component or an inorganic component.

A PCM or component of a PCM may me formed from multiple materials. For example, a PCM may have a first component and a second component, and the second PCM component may be formed from or comprise or include at least two materials, such as two or more materials from Table I. In embodiments in which a PCM component comprises or is formed from multiple components, individual materials may be included in a PCM component in any ratio not inconsistent with the objectives of the present invention. For example, in some instances, a PCM component of a PCM or combination of PCMs used in a cart described herein comprises a first material to second material ratio ($M_1:M_2$) by weight ratio or % weight of the second PCM component of between 80:20 and 20:80. For example, in some embodiments $M_1:M_2$ is between 75:25 and 20:80, between 70:30 and 20:80, between 65:35 and 20:80, between 60:40 and 20:80, between 55:45 and 20:80, between 50:50 and 20:80, between 45:55 and 20:80, or between 40:60 and 20:80. Additionally, in certain instances, $M_1:M_2$ is between 80:20 and 25:75, such as between 80:20 and 30:70, between 80:20 and 35:75, between 80:20 and 40:60, between 80:20 and 45:55, between 80:20 and 50:50, between 80:20 and 55:45, or between 80:20 and 60:40.

In certain implementations, a PCM used with a cart described herein comprises 0.5-10 wt. % polysaccharide or polysaccharide component, and 88-99.5 wt. % water, based on the total weight of the composition. Moreover, in some cases, such a composition is self-supporting or shape-stable, including at ambient or other moderate temperature and pressure. For example, in some cases, a composition is shape stable (including without support by side walls or a container or the like) at temperatures above 0° C. at 1 atm, such as at one or more temperatures selected from Table I below. Additionally, the relative humidity may be 50%.

TABLE III

Shape Stable Temperatures of a Composition Described herein at 1 atm.

0° C. to 100° C.
0° C. to 90° C.
0° C. to 80° C.
0° C. to 70° C.
0° C. to 60° C.
0° C. to 50° C.
0° C. to 40° C.
0° C. to 30° C.
0° C. to 20° C.
10° C. to 100° C.
10° C. to 90° C.
10° C. to 80° C.
10° C. to 70° C.
10° C. to 60° C.
10° C. to 50° C.
10° C. to 40° C.
10° C. to 30° C.
10° C. to 20° C.
20° C. to 100° C.
20° C. to 90° C.
20° C. to 80° C.
20° C. to 70° C.
20° C. to 60° C.
20° C. to 50° C.
20° C. to 40° C.
20° C. to 30° C.
30° C. to 100° C.
30° C. to 90° C.
30° C. to 80° C.
30° C. to 70° C.
30° C. to 60° C.
30° C. to 50° C.
30° C. to 40° C.
40° C. to 100° C.
40° C. to 90° C.
40° C. to 80° C.
40° C. to 70° C.
40° C. to 60° C.
40° C. to 50° C.

Such a shape stable composition, in some implementations, does not deform or flow substantially under these conditions for more than 1 hour, more than 2 hours, more than 5 hours, or more than 12 hours. In some implementations, the compositions is solid or is shape-stable and does not flow or deform for 1-24 hours, 1-12 hours, 2-18 hours, or 2-6 hours under the conditions described above.

Moreover, in some instances, a PCM or PCM component described herein may have some fluidity, such as may be exhibited by a paste or gel. For example, in some cases, a composition described herein has a dynamic viscosity of greater than or equal to 300,000 cP at 20° C. and 1 atm. A PCM or PCM component described herein may also comprise a network, such as a crosslinked polysaccharide network. Moreover, in some instances, a PCM or PCM component described herein comprises a polysaccharide network including many hydrogen bonds with water. Additionally, not intending to be bound by theory, the water may form a continuous phase within a scaffolding formed by the polysaccharide.

A PCM or PCM component described herein can have any pH not inconsistent with the objectives of the present disclosure. For example, a composition described herein can have a pH of between about 2 and about 12, such as between about 2 and about 7, between about 7 and about 12, between about 5 and about 7, between about between about 3 and about 7, between about 4 and about 7, between about 5 and about 7, or between about 6 and about 7. Further, a pH of a composition described herein can be between about 7 and about 12, between about 8 and about 12, between about 8 and about 12, between about 9 and about 12, between about 10 and about 12, or between about 11 and about 12. Moreover, a composition described herein may have a pH of between about 7 and about 11, between about 7 and about 10, between about 7 and about 9, or between about 7 and about 8. Additionally, a composition described herein may have a pH between about 5 and about 9, such as between about 5 and about 8, between about 6 and about 9, or between about 6 and about 8, between about 6 and about 7, or between about 7 and about 8. Not intending to be bound by theory, the use of one or more pH modulators can permit a composition described herein to be prepared and/or used across a variety of pH ranges.

Further, in some embodiments, one or more properties of a PCM described herein can be modified by the inclusion of one or more additives. Such an additive described herein can be mixed with a PCM and/or otherwise disposed in a cart described herein. In some embodiments, an additive comprises an antimicrobial material. Any antimicrobial material not inconsistent with the objectives of the present disclosure may be used. An antimicrobial material, in some cases, comprises an inorganic composition, including metals and/or metal salts. In some embodiments, for example, an antimicrobial material comprises metallic copper, zinc, or silver or a salt of copper, zinc, or silver. Moreover, in some instances, an antimicrobial material comprising a metal can also provide thermal conductivity modulation. In other embodiments, an antimicrobial material comprises an organic composition, including natural and synthetic organic compositions. In some cases, an antimicrobial material comprises a β-lactam such as a penicillin or cephalosporin. In some implementations, an antimicrobial material comprises a protein synthesis inhibitor such as neomycin. In some embodiments, an antimicrobial material comprises an organic acid, such as lactic acid, acetic acid, or citric acid. In some cases, an antimicrobial material comprises a quarternary ammonium species. A quarternary ammonium species, in some embodiments, comprises a long alkyl chain, such as an alkyl chain having a C8 to C28 backbone. In some instances, an antimicrobial material comprises one or more of benzalkonium chloride, benzethonium chloride, methylbenzethonium chloride, cetalkonium chloride, cetylpyridinium chloride, cetrimonium, cetrimide, dofanium chloride, tetraethylammonium bromide, didecyldimethylammonium chloride, and domiphen bromide.

In other embodiments, an additive comprises a nucleating agent. A nucleating agent, in some embodiments, can help avoid subcooling, particularly for PCMs comprising finely distributed phases, such as fatty alcohols, paraffinic alcohols, amines, and paraffins. Any nucleating agent not inconsistent with the objectives of the present disclosure may be used.

In some embodiments, for example, an additive comprises an ionic liquid. Any ionic liquid not inconsistent with the objectives of the present invention may be used. In some embodiments, an ionic liquid is imidazolium-based. In other embodiments, an ionic liquid is pyridinium-based. In some embodiments, an ionic liquid is choline-based. Further, in some embodiments, an ionic liquid comprises a sugar, sugar alcohol, or sugar derivative, such as glycol-choline, glycerol-choline, erythritol-choline, threitol-choline, arabitol-choline, xylitol-choline, ribitol-choline, mannitol-choline, sorbitol-choline, dulcitol-choline, iditol-choline, isomaltcholine, maltitol-choline, or lactitol-choline. Non-limiting examples of ionic liquids suitable for use in some embodiments described herein include 1-Allyl-3-methylimidazolium bis(trifluoromethylsulfonyl)imide, 1-Allyl-3-methylimidazolium bromide, 1-Allyl-3-methylimidazolium dicyanamide, 1-Allyl-3-methylimidazolium iodide, 1-Benzyl-3-methylimidazolium chloride, 1-Benzyl-3-methylimidazolium hexafluorophosphate, 1-Benzyl-3-methylimidazolium tetrafluoroborate, 1,3-Bis(3-cyanopropyl)imidazolium bis(trifluoromethylsulfonyl)imide, 1,3-Bis(3-cyanopropyl)imidazolium chloride, 1-Butyl-2,3-dimethylimidazolium hexafluorophosphate, 1-Butyl-2,3-dimethylimidazolium tetrafluoroborate, 4-(3-Butyl-1-imidazolio)-1-butanesulfonate, 1-Butyl-3-methylimidazolium acetate, 1-Butyl-3-methylimidazolium chloride, 1-Butyl-3-methylimidazolium dibutyl phosphate, 1-Butyl-3-methylimidazolium hexafluorophosphate, 1-Butyl-3-methylimidazolium nitrate, 1-Butyl-3-methylimidazolium octyl sulfate, 1-Butyl-3-methylimidazolium tetrachloroaluminate, 1-Butyl-3-methylimidazolium tetrafluoroborate, 1-Butyl-3-methylimidazolium thiocyanate, 1-Butyl-3-methylimidazolium tosylate, 1-Butyl-3-methylimidazolium trifluoroacetate, 1-Butyl-3-methylimidazolium trifluoromethanesulfonate, 1-(3-Cyanopropyl)-3-methylimidazolium bis(trifluoromethylsulfonyl)amide, 1-Decyl-3-methylimidazolium tetrafluoroborate, 1,3-Diethoxyimidazolium bis(trifluoromethylsulfonyl)imide, 1,3-Diethoxyimidazolium hexafluorophosphate, 1,3-Dihydroxyimidazolium bis(trifluoromethylsulfonyl)imide, 1,3-Dihydroxy-2-methylimidazolium bis(trifluoromethylsulfonyl)imide, 1,3-Dimethoxy-2-methylimidazolium hexafluorophosphate, 1-Dodecyl-3-methylimidazolium iodide, 1-Ethyl-2,3-dimethylimidazolium tetrafluoroborate, 1-Ethyl-3-methylimidazolium hexafluorophosphate, 1-Ethyl-3-methylimidazolium L-(+)-lactate, 1-Ethyl-3-methylimidazolium 1,1,2,2-tetrafluoroethanesulfonate, 1-Hexyl-3-methylimidazolium bis(trifluormethylsulfonyl)imide, 1-Hexyl-3-methylimidazolium chloride, 1-Hexyl-3-methylimidazolium hexafluorophosphate, 1-Methylimidazolium chloride, 1-Methyl-3-octylimidazolium chloride, 1-Methyl-3-octylimidazolium tetrafluoroborate, 1-Methyl-3-propylimidazolium iodide, 1-Methyl-3-(3,3,4,4,5,5,6,6,7,7,8,8,8-tridecafluorooctyl)imidazolium hexafluorophosphate, 1,2,3-Trimethylimidazolium methyl sulfate, 1-Butyl-4-methylpyridinium chloride, 1-Butyl-4-methylpyridinium hexafluorophosphate, 1-Butylpyridiniumbromide, 1-(3-Cyanopropyl)pyridiniumchloride, 1-Ethylpyridinium tetrafluoroborate, 3-Methyl-1-propylpyridinium bis(trifluormethylsulfonyl)imide, and Cholin acetate, all available commercially from Sigma-Aldrich.

In some embodiments, an additive comprises an aerogel. Any aerogel not inconsistent with the objectives of the present invention may be used. An aerogel, in some embodiments, comprises an organic composition such as agar. In some embodiments, an aerogel comprises carbon. In some embodiments, an aerogel comprises alumina. In some embodiments, an aerogel comprises silica, including fumed silica. Moreover, an aerogel comprising fumed silica, in some embodiments, comprises particles having a size from about 1 m to about 10 mm. In some embodiments, the particles have a size from about 1 m to about 100 m, from about 1 m to about 10 m, or from about 5 m to about 10 m. Further, in some embodiments, an aerogel has high porosity. For instance, in some embodiments, an aerogel comprises over 90 percent air. In addition, in some embodiments, an aerogel comprises pores having a size between about 1 nm and about 100 nm. In some embodiments, the pores have a size between about 10 nm and about 100 nm or between about 20 nm and about 40 nm. Moreover, an aerogel described herein, in some embodiments, has a high surface area, such as a surface area of about 500 $m^2/g$ or more. In some embodiments, an aerogel has a surface area between about 500 $m^2/g$ and about 1000 $m^2/g$ or between about 600 $m^2/g$ and about 900 $m^2/g$. In addition, in some embodiments, an aerogel has a low tap density. In some embodiments, for instance, an aerogel has a tap density less than about 500 $kg/m^3$ or less than about 100 $kg/m^3$. In some embodiments, an aerogel has a tap density between about 1 $kg/m^3$ and about 200 $kg/m^3$, between about 10 $kg/m^3$ and about 100 $kg/m^3$. Further, in some embodiments, an aerogel described herein has a low thermal conductivity. In some embodiments, an aerogel has a thermal conductivity less than about 50 mW/mK or less than about 20 mW/mK. In some embodiments, an aerogel has a thermal conductivity between about 1 mW/mK and about 20 mW/mK or between about 5 mW/mK and about 15 mW/mK. Moreover, in some embodiments, an aerogel has a hydrophobic surface. In addition, in some embodiments, an aerogel has a high oil absorption capacity (DBP). In some embodiments, an aerogel has an oil absorption capacity greater than about 100 g/100 g. In some embodiments, an aerogel has an oil absorption capacity greater than about 500 g/100 g. In some embodiments, an aerogel has an oil absorption capacity between about 100 g/100 g and about 1000 g/100 g, between about 300 g/100 g and about 800 g/100 g, or between about 400 g/100 g and about 600 g/100 g. Further, in some embodiments, an aerogel has a specific heat capacity between about 0.1 kJ/(kg K) and about 5 kJ/(kg K). In some embodiments, an aerogel has a specific heat capacity between about 0.5 kJ/(kg K) and about 1.5 kJ/(kg K).

In some embodiments, compositions described herein also can include a polymeric material. Any polymeric material not inconsistent with the objectives of the present invention may be used. In some embodiments, a polymeric material comprises an organic composition. For example, in some embodiments, a polymeric material comprises a polyolefin such as polyethylene or polypropylene, a polycarbonate, a polyester, or a polyurethane. In some embodiments, a polymeric material comprises polyvinyl alcohol (PVA). In some embodiments, a polymeric material comprises an acrylonitrile, including a polyacrylonitrile or acrylonitrile copolymer. An acrylonitrile copolymer, in some embodiments, comprises styrene-acrylonitrile (SAN), acrylonitrile styrene acrylate (ASA), acrylonitrile butadiene (NBR), and acrylonitrile butadiene styrene (ABS). In some embodiments, a composition comprises a particulate polymeric material, such as ABS grains.

In some embodiments, a polymeric material comprises a styrene block copolymer (SBC). A styrene block copolymer, in some embodiments, comprises a linear triblock copolymer. The linear triblock copolymer, in some embodiments, comprises an A-B-A structure, where the A blocks comprise polystyrene and the B block comprises an elastomer. In some embodiments, an SBC comprises between about 20 percent and about 40 percent polystyrene. In some embodiments, an SBC comprises between about 25 percent and about 35 percent polystyrene. Further, in some embodiments, an SBC can be maleated or unmaleated. Moreover, in some embodiments, an SBC has an average molecular weight greater than about 75,000. In some embodiments, an SBC has an average molecular weight greater than about 200,000. In some embodiments, an SBC has an average molecular weight between about 75,000 and about 1,000,000, between about 75,000 and about 500,000, or between about 100,000 and about 300,000. For reference purposes herein, molecular weight comprises weight average molecular weight. In addition, in some embodiments, an SBC has a specific gravity less than about 1. In some embodiments, an SBC has a Shore A hardness between about 50 and about 100. In some embodiments, an SBC has a Shore A hardness between about 50 and about 75 or between about 55 and about 70. Non-limiting examples of SBCs useful in some embodiments described herein include styrene-ethylene-butylene-styrene, styrene-ethylene-propylene-styrene, styrene-ethylene-ethylene/propylene-styrene, styrene-isobutylene-styrene, styrene-butadiene-styrene, styrene-isoprene-styrene, and combinations thereof. Commercially available SBCs useful in some embodiments described herein include SBCs provided by Kraton Polymers (Houston, Tex.), such as Kraton G1651HU, Kraton G1650, Kraton G1652, and Kraton G1654H.

In some embodiments, a polymeric material comprises a biopolymer. For instance, in some embodiments, a polymeric material comprises cellulose or a cellulosic material or cellulose derivative. In some embodiments, a polymeric material comprises hydroxymethyl cellulose (HMC), hydroxyethyl cellulose (HEC), hydroxypropyl cellulose (HPC), hydroxypropylmethyl cellulose (HPMC), hydroxypropyl methylcellulose phthalic ester (HPMCP), methyl cellulose (MC), ethyl cellulose (EC), carboxymethyl cellulose (CMC), and/or polyanionic cellulose (PAC). In some embodiments, a cellulosic material or cellulose derivative has a molecular weight between about 100,000 and about 2,000,000. In some embodiments, a cellulosic material or cellulosic derivative has a molecular weight between about 250,000 and about 1,500,000, between about 250,000 and about 450,000, between about 750,000 and about 950,000, or between about 1,000,000 and about 1,300,000. Further, in some embodiments, a polymeric material comprises chitosan. In some embodiments, the chitosan has a molecular weight between about 3000 and 20,000. Further, in some embodiments, the chitosan has a degree of deacetylation between about 50 percent and about 100 percent.

In some embodiments, an additive comprises an inorganic composition. For example, in some embodiments, an additive comprises a zeolite. Any zeolite not inconsistent with the objectives of the present invention may be used. In some embodiments, a zeolite comprises a natural zeolite. In other embodiments, a zeolite comprises an artificial zeolite. In some embodiments, a zeolite comprises a silicate and/or aluminosilicate. In some embodiments, a zeolite comprises a composition according to the formula $M_{x/n}$ [$(AlO_2)_x$ $(SiO_2)_y$].w $H_2O$, where n is the valence of cation M (e.g., $Na^+$, $K^+$, $Ca^{2+}$, or $Mg^{2+}$), w is the number of water molecules per unit cell, and x and y are the total number of tetrahedral atoms per unit cell. Non-limiting examples of zeolites suitable for use in some embodiments described herein include analcime (($K,Ca,Na)AlSi_2O_6.H_2O$), chabazite (($Ca,Na_2,K_2,Mg)Al_2Si_4O_{12}.6H_2O$), clinoptilolite (($Na$, $K,Ca)_{2-3}Al_3(Al$, $Si)_2Si_{13}O_{36}.12H_2O$), heulandite (($Ca$, $Na)_{2-3}Al_3(Al,Si)_2Si_{13}O_{36}.12H_2O$), natrolite ($Na_2Al_2$ $Si_3O_{10}.2H_2O$), phillipsite (($Ca,Na_2,K_2)_3Al_6Si_{10}$ $O_{32}.12H_2O$), and stilbite ($NaCa_4(Si_{27}Al_9)O_{72}0.28(H_2O)$).

In some embodiments, an additive comprises a thermal conductivity modulator. Any thermal conductivity modulator not inconsistent with the objectives of the present invention may be used. In some embodiments, for instance, a thermal conductivity modulator comprises carbon, including graphitic carbon. In some embodiments, a thermal conductivity modulator comprises carbon black and/or carbon nanoparticles. Carbon nanoparticles, in some embodiments, comprise carbon nanotubes and/or fullerenes. In some embodiments, a thermal conductivity modulator comprises a graphitic matrix structure. In other embodiments, a thermal conductivity modulator comprises an ionic liquid. In some embodiments, a thermal conductivity modulator comprises a metal, including pure metals and alloys. Any metal not inconsistent with the objectives of the present invention may be used. In some embodiments, a metal comprises a transition metal, such as silver or copper. In some embodiments, a metal comprises an element from Group 13 or Group 14 of the periodic table. In some embodiments, a metal comprises aluminum. In some embodiments, a thermal conductivity modulator comprises a metallic filler, a metal matrix structure, a metal tube, a metal plate, and/or metal shavings. Further, in some embodiments, a thermal conductivity modulator comprises a metal oxide. Any metal oxide not inconsistent with the objectives of the present invention may be used. In some embodiments, a metal oxide comprises a transition metal oxide. In some embodiments, a metal oxide comprises alumina.

In some embodiments, an additive comprises a fire retardant. Any fire retardant not inconsistent with the objectives of the present invention may be used. In some embodiments, a fire retardant comprises a foam. Further, in some embodiments, a fire retardant can comprise an organic composition or an inorganic composition. In some embodiments, a fire retardant comprises tris(2-chloro-1-(chloromethyl)ethyl) phosphate. In some embodiments, a fire retardant comprises aluminum hydroxide and/or magnesium hydroxide. In some embodiments, a fire retardant comprises a zeolite, including a zeolite described herein.

In some embodiments, an additive comprises a catalyst. Any catalyst not inconsistent with the objectives of the present invention may be used. In some embodiments, a catalyst is selected based on the identity of one or more of a desired chemical bond, a solvent, a PCM, and a linker component. In some embodiments, a catalyst comprises a tertiary amine, such as triethylamine or triethanolamine. In other embodiments, a catalyst comprises an organometallic complex. In some embodiments, a catalyst comprises a metal complex comprising mercury, lead, tin, bismuth or zinc, including organometallic complexes. In some embodiments, a catalyst comprises a dibutyltin, such as dibutyltin laurate. Moreover, in some embodiments, a catalyst is provided in an amount less than about 0.1 weight percent. In some embodiments, a catalyst is provided in an amount between about 0.001 and about 0.1 weight percent.

The present disclosure also describes methods of using systems or carts for maintaining a desired temperature set point, particularly for the preparation, storage, display, and/or service of food. In some embodiments, such a method comprises providing a cart or system described herein, and heating or cooling the PCM of the cart or system above or below a phase transition temperature of the PCM. The method further comprises placing food on an exterior work surface of the cart or system. As described further herein, the exterior work surface of the cart or system (which may be, for instance, a well or pan of the cart or system, or which may be simply a "table top" type surface of the cart or system) can be kept at a desired temperature using heat exchange conduits and PCM, where the latent heat of the PCM provides a large effective thermal mass for long-term "passive" cooling that does not rely on (during normal use, as opposed to during "recharging" of the PCM) "active" heating or cooling such as provided by a mechanical heating or cooling unit or system. Additionally, in some embodiments, a method described herein further comprises transferring thermal energy from the food to the PCM (e.g., when the food is cooled by the PCM) or from the PCM to the food (e.g., when the food is heated by the PCM), thereby controlling the temperature of the food.

A system, cart, or method described herein can be used to regulate or control the temperature of any food type or food preparation, service, processing, storage, or display surface or area not inconsistent with the objectives of the present disclosure. For example, in some embodiments, the food comprises one or more of the following: meat such as raw meat (e.g., chicken or other poultry, beef, pork, fish or other seafood), fruits or vegetables (raw or cooked), dairy products (such as milk or cheese), grains or grain components (such as flour or breading), or oils. In some instances, a system, cart, or method described herein provides a temperature-controlled food preparation surface or table, such as may be used to bread chicken breasts or filets prior to further processing, such as frying.

III. Figures

Turning now to FIG. 1, an illustrative perspective view of an example embodiment of a temperature control cart (100). In the example a temperature control cart (100) is configured with a fame (114) that is supported by legs (110), and wheels (112). The frame (114) is typically fabricated from metal, and in one aspect is built rigid enough to hold a tank (108) disposed with PCM material. The frame in one example, is capable of holding up to 1,500 lbs, and in other examples (depending on the size of the frame and material) it may hold weights far greater. In other aspects, the frame of the temperature control cart may be comprised of other rigid, durable, and high strength materials along with metals, such as carbon fiber, wood, and polymers. In such aspects the additional materials may be highly thermal conductive materials, such as metal foams and other embodiments, as well as low thermal conductivity materials. In one aspect high density polyethylene (HDPE) is used to fabricate aspects of the temperature control cart. In another aspect, polyamide-imide (PAI), with a tensile strength of over 21,000 psi may be used as elements of the temperature control cart. Further, PAI is equipped with strong wear and low flammability and smoke emission. In another example, nylon may be configured within the temperature control cart to reduce cost and weight and as a complement to many metallic components. In the example of carbon fiber or other non-metallic materials, they may be supplement in locations that provide reduced weight, increased resistance to wear, and lower the overall cost of production. In even further aspects, wood components may be configured to the temperature control cart for reduced cost or aesthetics, or for other fabricating reasons.

Thermally conductive materials which may form one or more materials of the temperature control cart described herein have a thermal conductivity greater than or equal to a thermal conductivity of the PCM disposed within the interior volume of the container(s). Specifically, in some embodiments, the thermally conductive material has a thermal conductivity higher than a thermal conductivity of the PCM within the interior volume of the temperature control cart tank. Thermally conductive materials which may form one or more materials of the temperature control cart described herein may have a thermal conductivity of at least 0.2 W/m*K. For example, in some embodiments, thermally conductive materials have a thermal conductivity of at least 0.4 W/m*K, such as at least 0.5 W/m*K, at least 0.75 W/m*K, or at least W/m*K. In some instances, a thermally conductive material has a thermal conductivity of between 0.2 and 450 W/m*K, such as between 0.4 W/m*K and 450 W/m*K, 0.2 and 400 W/m*K, 0.2 and 350 W/m*K, 0.2 and 300 W/m*K, 0.2 and 250 W/m*K, 0.2 and 200 W/m*K, 0.2 and 150 W/m*K, or 0.2 and 100 W/m*K. In some instances, the thermally conductive material has a thermal conductivity of between 0.2 and 90 W/m*K, 0.2 and 75 W/m*K, 0.2 and 50 W/m*K, and 0.2 and 25 W/m*K. In certain other implementations, the thermally conductive material has a thermal conductivity of between 0.4 and 400 W/m*K, 0.4 and 350 W/m*K, 0.4 and 300 W/m*K, 0.4 and 250 W/m*K, 0.4 and 200 W/m*K, 0.4 and 150 W/m*K, or 0.4 and 100 W/m*K. In yet further embodiments, the thermally conductive material has a thermal conductivity of between 0.4 and 90 W/m*K, 0.4 and 75 W/m*K, 0.4 and 50 W/m*K, and 0.4 and 25 W/m*K. In still further embodiments, the thermally conductive material has a thermal conductivity of at least 7 W/m*K, such as between 7 and 450 W/m*K. Additionally, in some instances, a thermal conductivity of the elements of the temperature control cart is at least one order of magnitude higher than a thermal conductivity of the PCM within the tank, such as at least two orders of magnitude higher, or at least three orders of magnitude higher. Not intending to be bound by theory, a temperature control cart being formed from one or more materials which has a thermal conductivity one or more orders of magnitude higher than the PCM within the tank of the temperature control cart may facilitate heat absorption and/or dissipation, thereby reducing "charging" time of the thermal storage cell and increasing the buffer time of the thermal storage battery while being "discharged."

In other aspects, the temperature control cart (100) may be designed for smaller spaces or located in a position that requires a smaller form factor, in such instances the overall frame (114) may be reduced in size and support lower weights. For example, in a medical temperature control cart, it may be fabricated to fit within a storage component of a helicopter for emergency medical delivery, or for an airplane for transit and delivery. In other embodiments it may be sized for dimensions of fitting under a countertop at a hospital, or fitting within a small enclosure of space, such as a cabinet in a hospital. In the cabinet example, the temperature control cart may be 0.60 meters by 0.60 meters, in other configurations it may be 0.40 meters by 0.50 meters. The size and shape of the temperature control cart is adaptable to the needs of the given application, one of skill in the art will quickly realize the applicability and configurations of the temperature control cart disclosed herein.

In the example, the tank (108) may be configured with a heat exchange assembly (depicted in FIG. 4) as well as several wells or vats to hold PCM components. The tank (108) may also be referred to as wells or live wells or vats and such terms may be used when referring to the tank (108). Further, the frame (114) is equipped to configure with a thermowell post (106), wherein heat exchange fluid may be circulated through the heat exchange assembly wherein the fluid may flow through copper or stainless steel pipes that are disposed within the PCM material in the tank (108). Additional piping material may be used, such as polymer based or other metallic piping to route the heat exchange fluid. Further, the heat exchange assembly may include a plate heat exchanger (discussed later).

The top portion (116) of the temperature control cart (100) maintains the working surface (118) and may also have several wells, wherein the pans (102) are placed. Wells are depressions wherein the pans (102) may configure with to hold the pans (102) in place. The wells may be configured in a variety of forms and in the example of FIG. 1 you can see one such arrangement. Further, the working surface (118) may be a smooth flat working surface, wherein the tank with PCM disposed is in contact with the top portion (116) wherein the working surface (118) exists to transfer thermal energy to and from. Thermal conductivity is the quantity of heat transferred due to a unit temperature gradient, un unit time under steady conditions in a direction normal to a surface of the unit area. Conductive heat transfer may be expressed as Fourier's Law, where $q=\sqrt{s/k}$ AdT. In this equation q is heat transfer (W, J/S, Btu/hr), and k is thermal conductivity of the material, s is the material thickness, and A is the heat transfer area ($m^2$, $ft^2$), and dT is the temperature gradient over the material. It may also be expressed as $K=\sqrt{A\Delta T/QD}$ where K is thermal conductivity, Q is the amount of heat transferred, d is the distance between the two isothermal planes, A is the surface area, and $\Delta T$ is the difference in temperature.

The working surface (118) may also be known as the top surface or the surface wherein the pans (102) are placed. The top portion (116) sits on top of the frame (114) and configures with wells in the tank (108) that contain PCM components. The PCM components are in contact with the metal surface of the tank, as well as the bottom or underside surface of the top portion (116). Therefore, the metal top portion and frame, often insulated in areas not in connection or contact with the disposed PCM component assist in transfer of thermal energy as the preferred metal has a high degree of thermal conductivity.

In one example, the working surface (118) is configured to hold blood products for transport within a hospital. In the example, the working surface (118) may be held between 17° C. and 32° C. for transport to a patient. In such an example the phase transition temperature may be customized for blood products. In another example, the working surface (118) may be held between 2° C. and 8° C. for live vaccines. In similar examples, one side of the temperature control cart working surface may be held between 2° C. and 8° C. for live vaccines, while the other side, bifurcated by a non-thermal conductive barrier, and or in contact with a different PCM component may provide a warming surface for preparation of administration of the vaccine. In such an example, the temperature controlled cart may hold the temperature for live vaccines as the hospital staff rounds to deliver the vaccines, as they warm the vaccine to effective administration temperature. In additional aspects, a vaccine may be kept in long term storage in a temperature control cart in temperatures from −80° C. to −60° C., or in storage as it is in transport and delivery. In other aspects, the vaccine may be kept in storage or held on the temperature control cart within a range of −30° C. and −15° C. Additional temperature ranges for the storage of medical products and devices is applicable and disclosed within various embodiments and tables herein.

Figure 2:
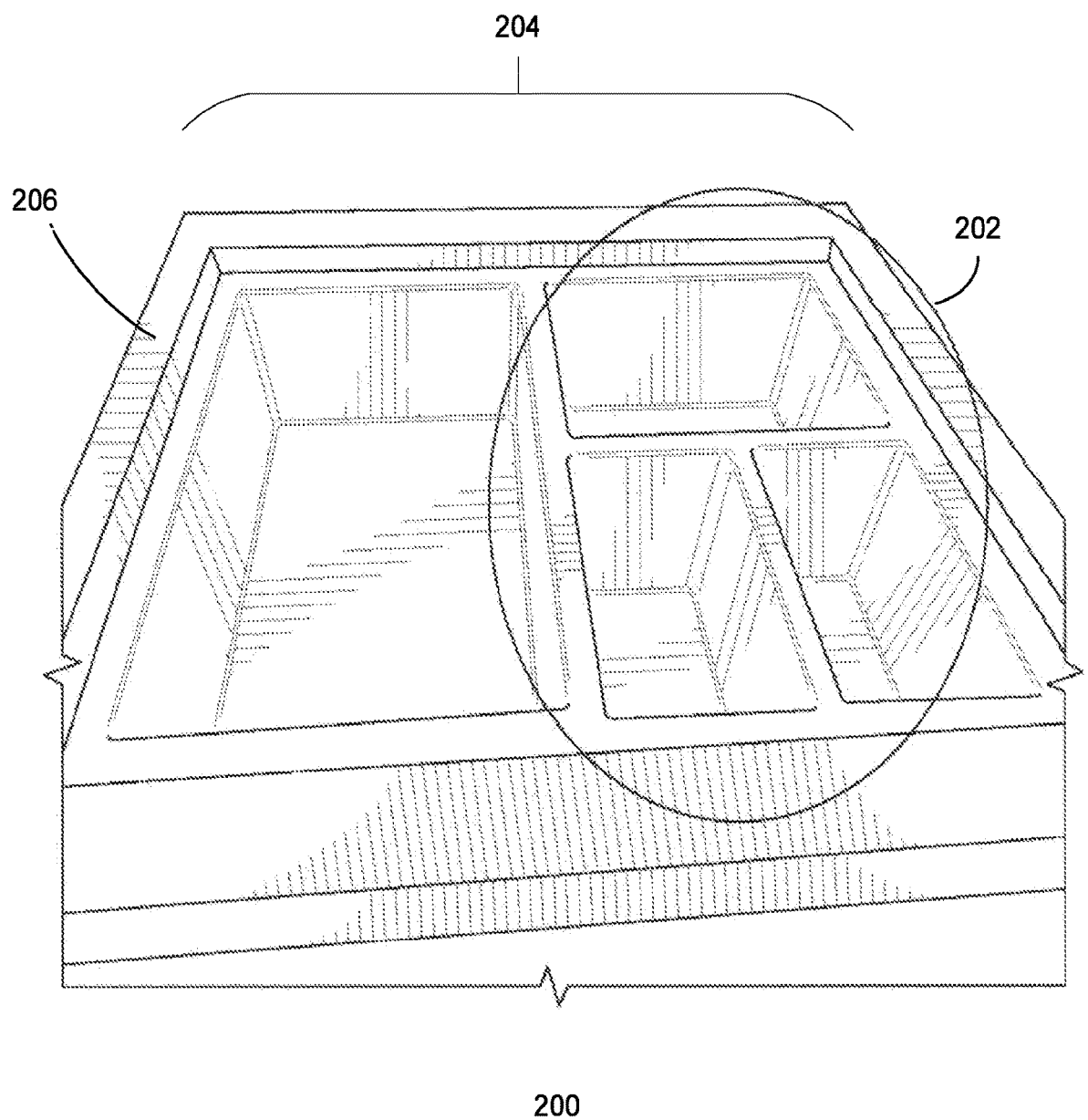
FIG. 2 illustrates a perspective view of an example embodiment of wells and/or compartments of a temperature control cart.

Referring to FIG. 2. An illustrative perspective of an example of wells (202) and/or compartments of a temperature control cart (200). The wells (202) form the bottom of the top portion (206) and may take on a variety of shapes and sizes to configure with pans (not depicted) wherein the payload, such as food or medicine, is placed. The wells (202) will typically be a highly thermal conductive metal, such as stainless steel, aluminum, or other metal. In other aspects, the wells may comprise a mixture of high thermally conductive and low thermally conductive materials. The bottom side of the wells (202) rest within the tank (not depicted) wherein the PCM component is disposed. The wells (202) are made for easy cleaning and configuration, they are interchangeable and form an interchangeable aspect. In other embodiments, the wells (202) are fixed, and the top portion (206) is fixed to the temperature control cart (200) frame. In such embodiments the tank may be interchangeable.

In the example, the wells define a contour that may be disposed within the tank containing PCM. The tank serves as a reservoir, a live well, a vat, and or a storage container for the PCM housed within the temperature control cart. The volume offset of the top portion (206) and the wells (202) may be configured at manufacture and etched into a variety of fill lines with the tank. Further, a specific limit on total well volume may be placed based on the overall heating or cooling goals and the size of the tank, as well as other factors such as ambient conditions and whether or not the temperature control cart is configured with active heating and/or cooling.

Figure 3:
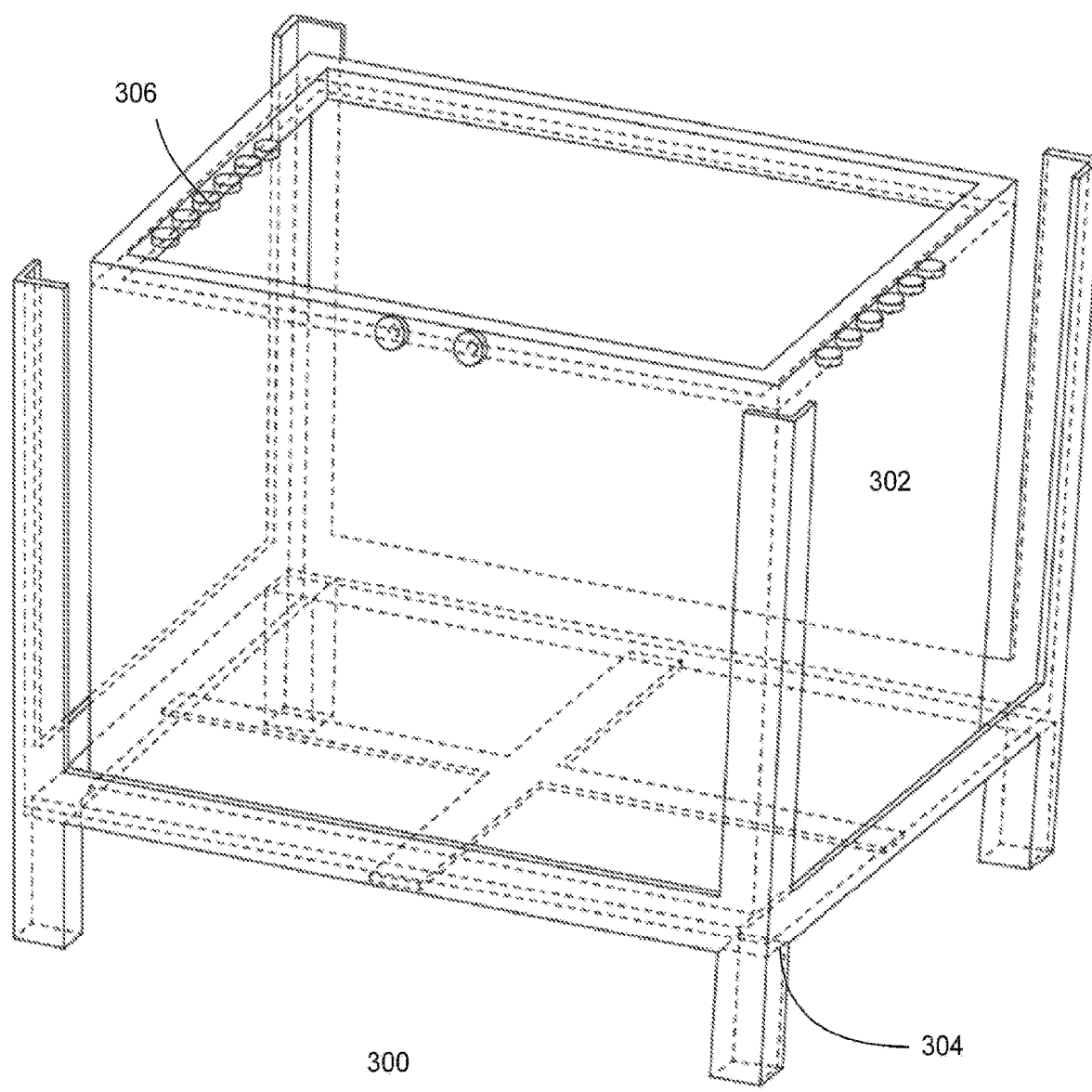
FIG. 3 illustrates a perspective view of an example embodiment of a frame for a temperature control cart with a removable tank.

Referring to FIG. 3. An illustrative perspective view of an example of a frame (304) for a temperature control cart (300) with a removable tank (302). The frame (304) may be optionally attached with wheels to improve transport. In certain embodiments, the temperature control cart (300) may be "charged" by placing it within a large walk in freezer. In other embodiments the temperature control cart (300) may be charged by liquid nitrogen tanks, or other heating or cooling means, such as a heat exchange assembly (discussed further herein), or through other mechanical or chemical heating or cooling means. Further, in some aspects, the charging may occur passively by placing the temperature control cart in ambient temperatures that allow the PCM to charge. When discussing "charging" the PCM is either heated or cooled above or below a phase transition state. By charging the PCM component, the PCM is in a phase transition state that is optimized for the particular use.

In the example of FIG. 3, a manifold (306) is depicted on both sides of the frame (304). The frame (304) may have the manifold (306) and lines running to and from integrated within the frame (304). In other embodiments, the manifold (306) may be integrated within the frame, and the lines running to and from applied after fabrication. In even further embodiments, the frame (304) may lack manifolds (306) and are equipped with another heat exchange assembly or system, or in even further embodiments such a system may not exist. The manifold (306), and other components configured to the manifold (306) may be pipes with threaded rods, or are further bolted, welded, configured, or placed within the frame (304) or otherwise integrated with the frame (304).

Figure 4:
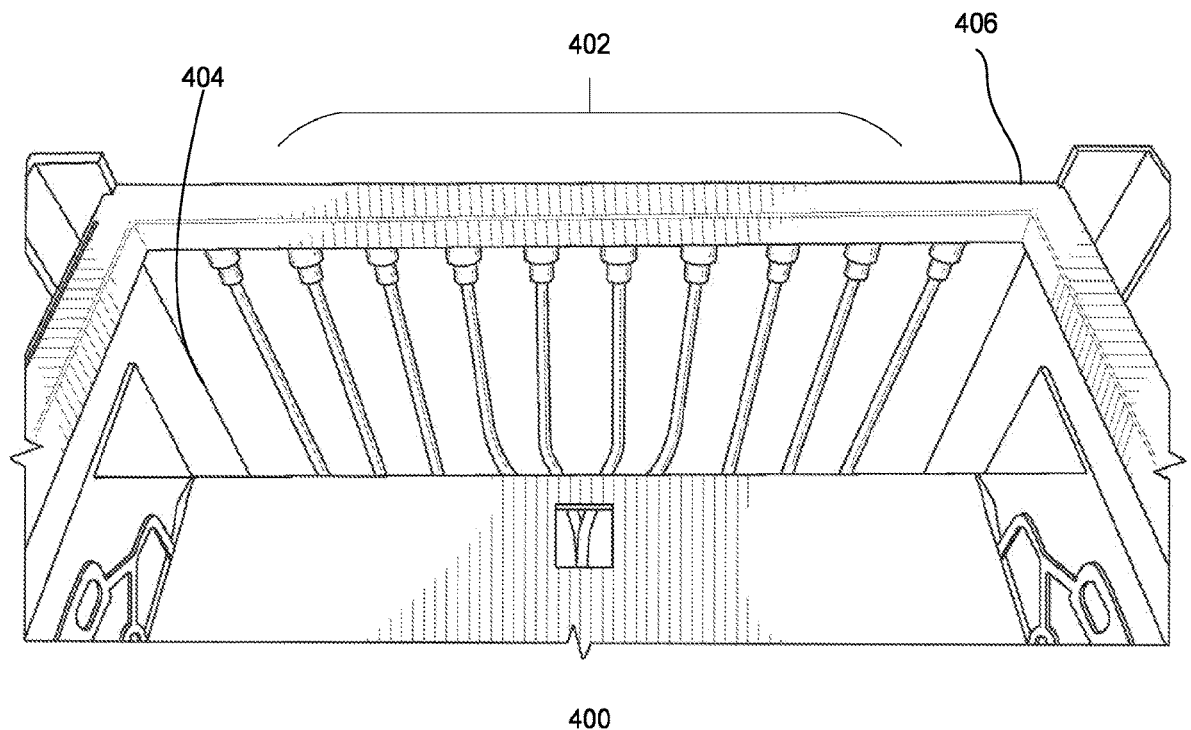
FIG. 4 illustrates a perspective view of an example embodiment of a heat exchange assembly of a temperature control cart.

Referring to FIG. 4. An illustrative perspective view of an example of a heat exchange assembly (402) integrated to a temperature control cart (400). In the example, a tank (404) is depicted with a heat exchange assembly (402) disposed within the interior volume of the tank (404). The heat exchange assembly (402) in one embodiment is configured to the back wall of the tank (404) of the temperature control cart (400). In other embodiments, the heat exchange assembly (402) may be placed or disposed in the interior volume, and surrounded by PCM components. Any type of PCM as described herein is applicable to fill the interior volume of the tank (404), and the selection of PCM is dependent upon a multitude of factors, including heating and/or cooling needs, the size of the tank (404), and more.

Figure 5:
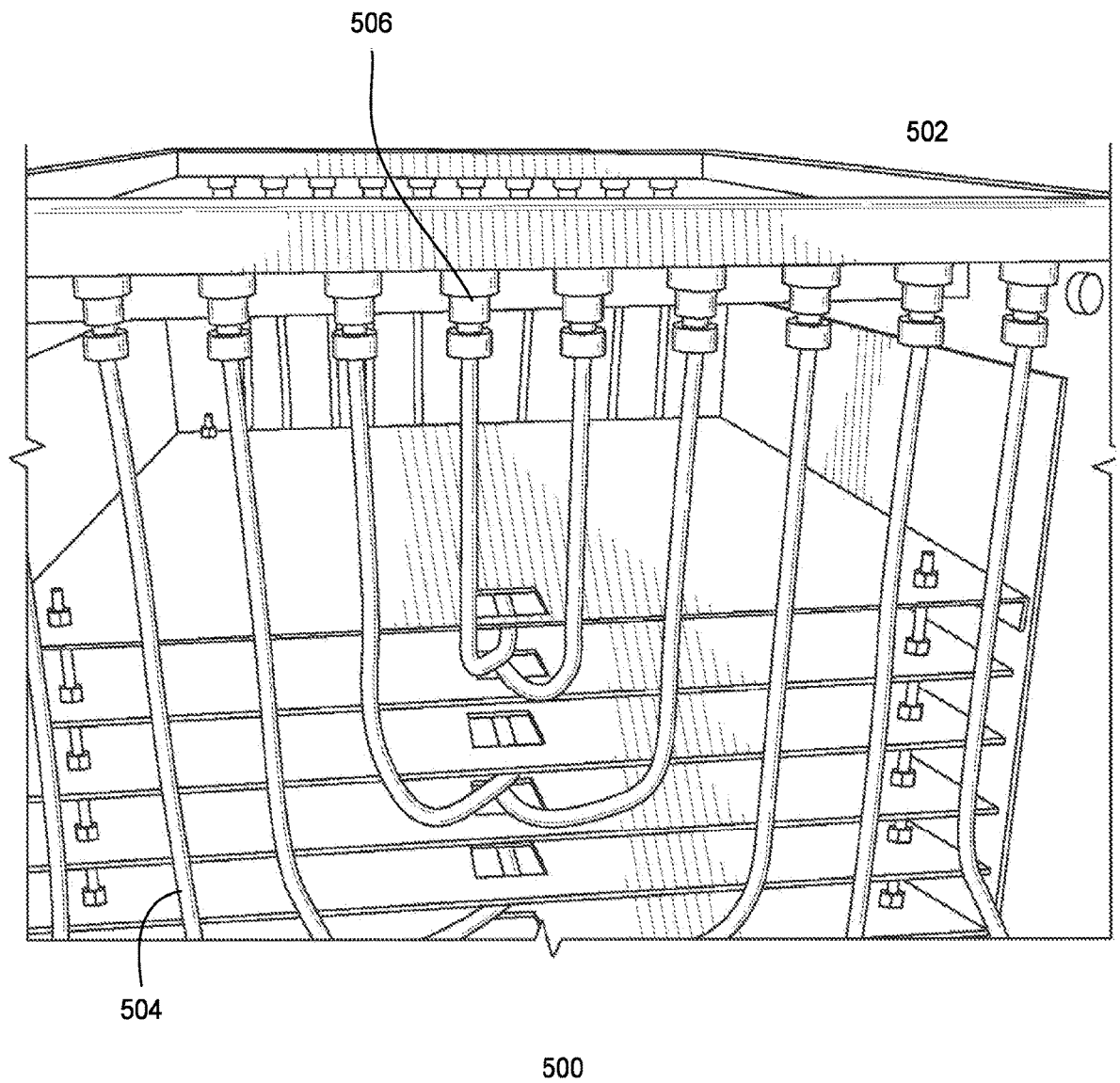
FIG. 5 illustrates an additional view of an example embodiment of a heat exchange assembly of a temperature control cart.

Turning now to FIG. 5, an additional view of an illustrative perspective of an example of a heat exchange assembly (502) integrated to a temperature control cart (500). The heat exchange assembly (502) comprises the manifold (506), and copper or stainless steel lines (504). In other embodiments the lines may be comprised of a variety of metals or polymers. In the example, the heat exchange assembly (502) is connected to built-in manifolds (506) integrated into the frame of the temperature control cart (500). In other embodiments it may be attached or otherwise configured as not a built in assembly. Also depicted within the example of FIG. 5 are stacks of conductive metal plates, that may also serve as additional thermal or heat exchange points. For example, a plate heat exchange component to the heat exchange assembly (502). Additionally, in the example, the interior volume of the tank is depicted, wherein the PCM component would be disposed. In additional embodiments the PCM component may be separated or isolated across the various wells, so that one well may provide heating, and another cooling, or even further two separate heating capacities. This can be accomplished by isolating different PCM components for wells that have the respective pans on the top portion.

Figure 6:
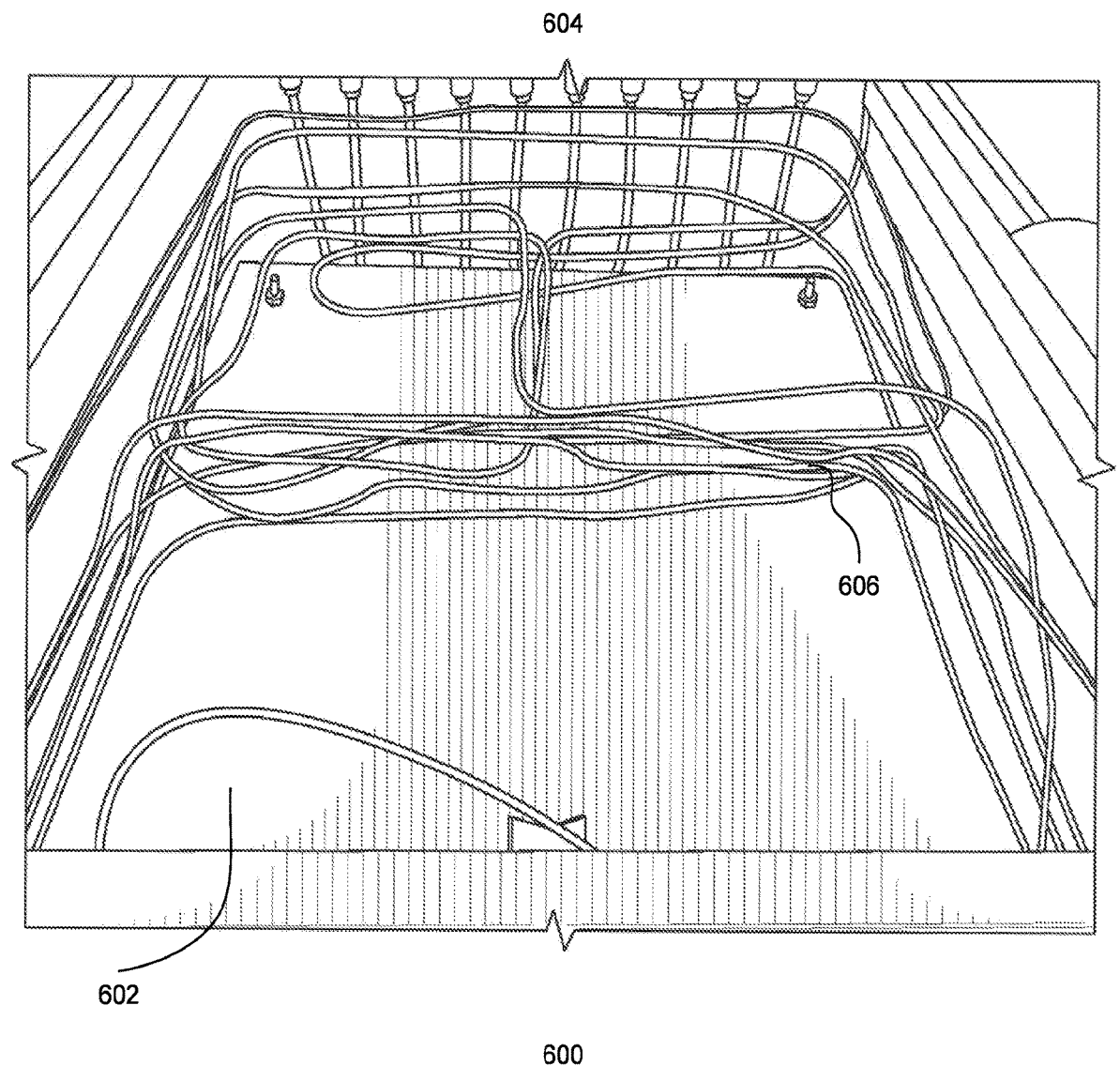
FIG. 6 illustrates a perspective view of an example embodiment of a removable tank and/or live well with a heat exchanger disposed within the PCM of a temperature control cart.

Referring now to FIG. 6. FIG. 6 discloses an illustrative perspective of an example embodiment of a removable tank (602) and/or live well with a heat exchange assembly (604) disposed within the PCM of a temperature control cart (600). In the example, a heat exchange assembly (604) is integrated within the frame of the temperature control cart (600). A manifold is depicted leading to copper lines (606), wherein the copper lines are disposed within the interior volume of the removable tank (602) and within the PCM. The PCM material is disposed within the removable tank (602) and allows for "charged" PCM filled tanks to be swapped into units. Therefore, eliminating the need for active on site heating or cooling for situations or scenarios that don't allow for utilities such as electricity, or which require an already charged PCM component. In other aspects the lines may be plates, or other mechanism for facilitating the transfer of thermal energy to the PCM component disposed within the interior volume of the exchangeable tank (602).

Figure 7A:
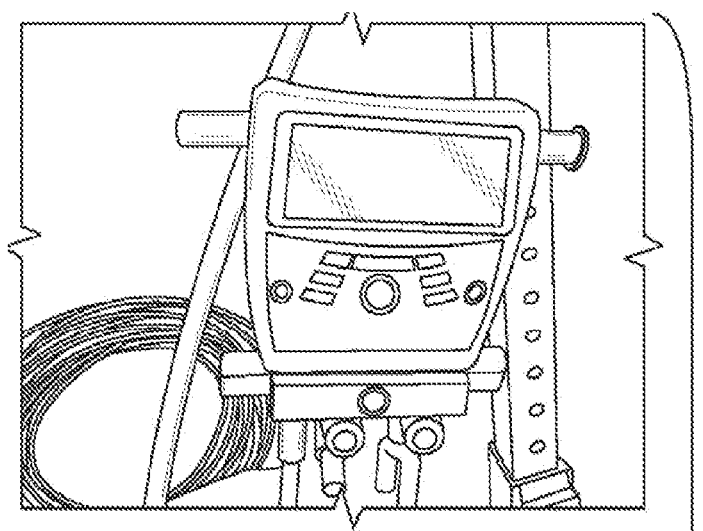
FIG. 7A illustrates an example embodiment of a control adapter for a refrigerant-based heat exchanger assembly for a temperature control cart.

Turning now to FIG. 7A. FIG. 7A illustrates an example embodiment of a control adapter for a refrigerant-based heat exchanger assembly for a temperature control cart. In the example the control adapter provides input to the mechanical units such as the circulation pump, and the refrigerant compressor or unit. In this example the control adapter also provides visual output to the user when adjusting or viewing the temperature control cart. Further, the control adapter may also connect to or configure to a wireless or wired assembly for further analysis at a remote computer or control by a remote computer.

Figure 7B:
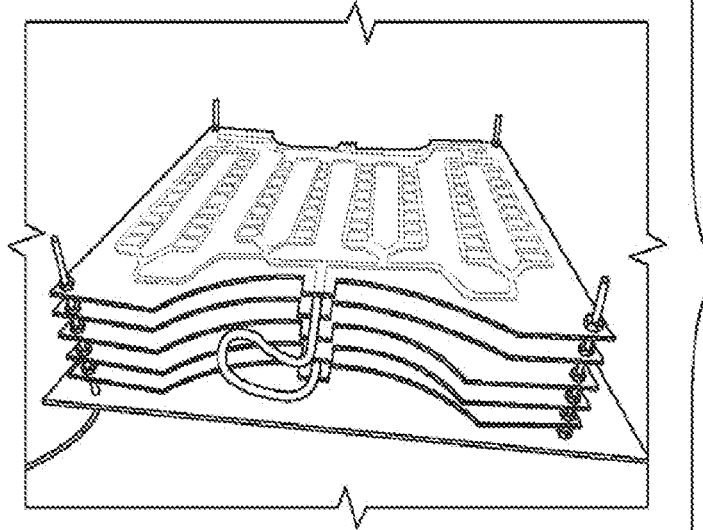
FIG. 7B illustrates an example embodiment of a heat exchanger module for a refrigerant-based heat exchanger assembly for a temperature control cart.

Turning now to FIG. 7B. FIG. 7B illustrates an example embodiment of a heat exchanger module for a refrigerant-based heat exchanger assembly for a temperature control cart. In the example the heat exchange module is a plate heat exchange module and is capable of configuring with additional plates for further customization and exchange properties. In the example the heat exchanger assembly can be configured by adding or removing additional heat exchange plates.

Figure 7C:
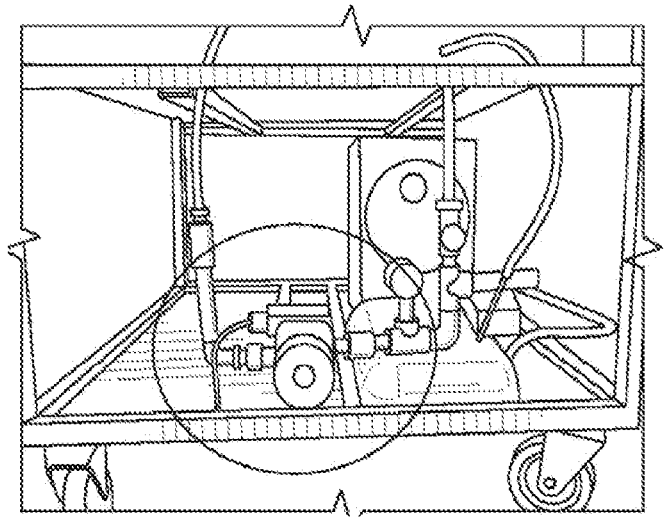
FIG. 7C illustrates an example embodiment of a circulation pump for a refrigerant-based heat exchanger assembly for a temperature control cart.

Turning now to FIG. 7C. FIG. 7C illustrates an example embodiment of a circulation pump for a refrigerant-based heat exchanger assembly for a temperature control cart. In the example the circulation pump circulates the heat exchange fluid from the refrigeration compressor or refrigeration unit through the manifold and through the heat exchange assembly depicted in FIG. 8B. In other examples the heat exchange assembly may be copper piping or stainless steel piping or other piping such as a plastic or polymer.

Figure 8:
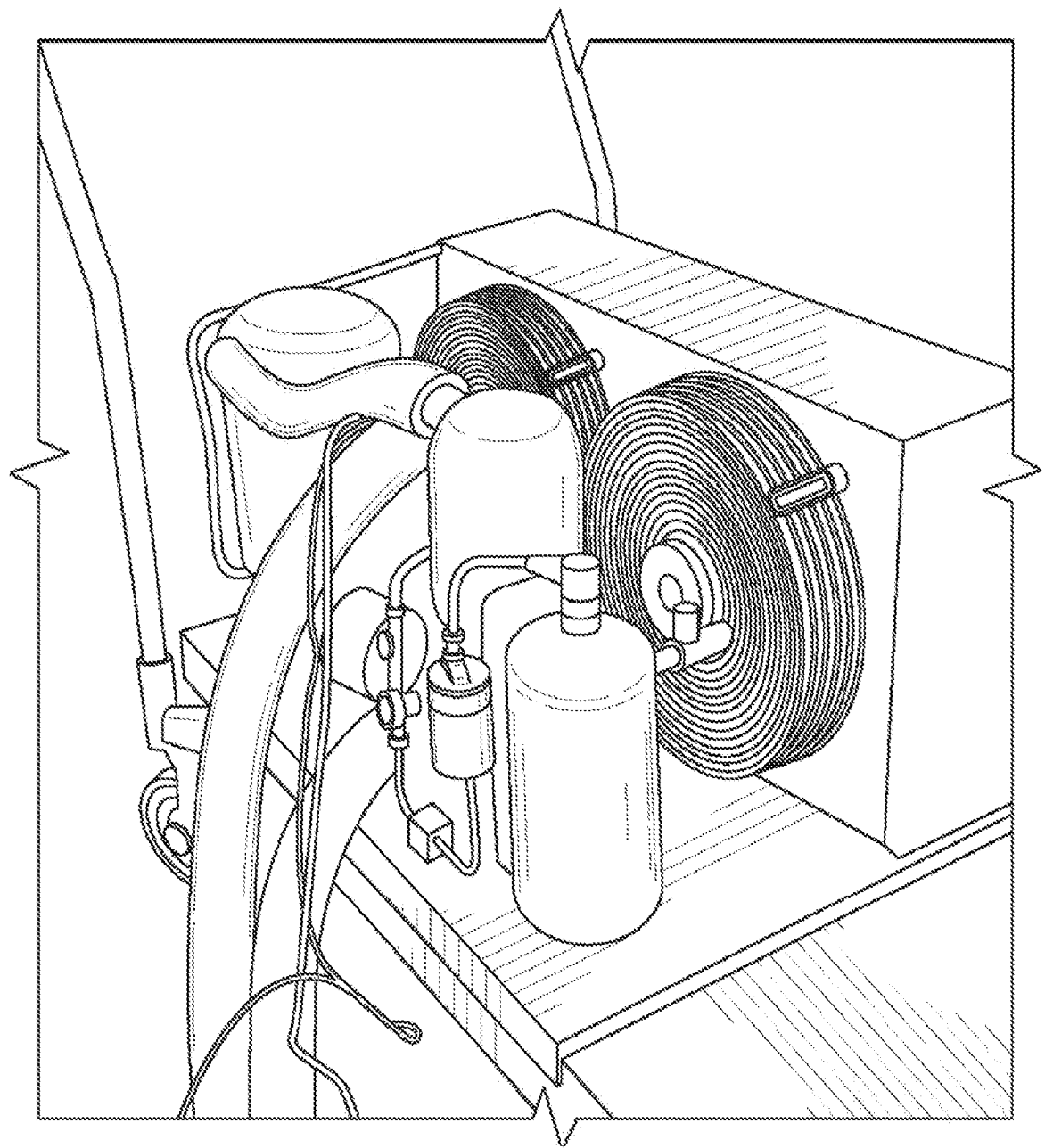
FIG. 8 illustrates an example embodiment of an external chiller system for a temperature control cart.

FIG. 8 illustrates an example embodiment of an external chiller system which may, in certain instances, be used with a temperature control cart described herein. Typical chiller systems use vapor compression and mechanical circulation. In the example, the chiller circulates the thermal exchange fluid, which can be a number of fluids, including glycol and water, through the temperature control cart's heat exchange assembly. In one aspect, the heat exchange assembly is fully integrated into the frame of the temperature control cart. In other aspects, the heat exchange assembly may be only partially integrated. In one aspect, the chiller contains a refrigerant, and work through the basic principles of compression and phase change. The refrigeration cycle, in some embodiments, starts with a low pressure liquid or gas mixture entering an evaporator. In the evaporator, heat from the heat exchange fluid boils or otherwise increases the temperature of the refrigerant, wherein it changes from a low pressure liquid to a low pressure gas. The low pressure gas enters the compressor, where it is compressed into high pressure gas. The high pressure gas enters the condenser, where ambient air or condenser fluid removes heat to cool the high pressure gas down to a high pressure liquid. The high pressure liquid then travels to the expansion valve which controls the flow of liquid refrigerant to the evaporator. The aforementioned is one example of a chiller system, other chiller systems are capable of being integrated into the systems, apparatus, and methods disclosed herein as a means for chilling a PCM component in the tank of the temperature control cart. In other examples, the temperature control cart may have just a heating system or just a cooling system. In further examples, the temperature control cart may not have any active heating or cooling systems, for instance, the cart may lack the heat exchange apparatus and system.

Figure 9:
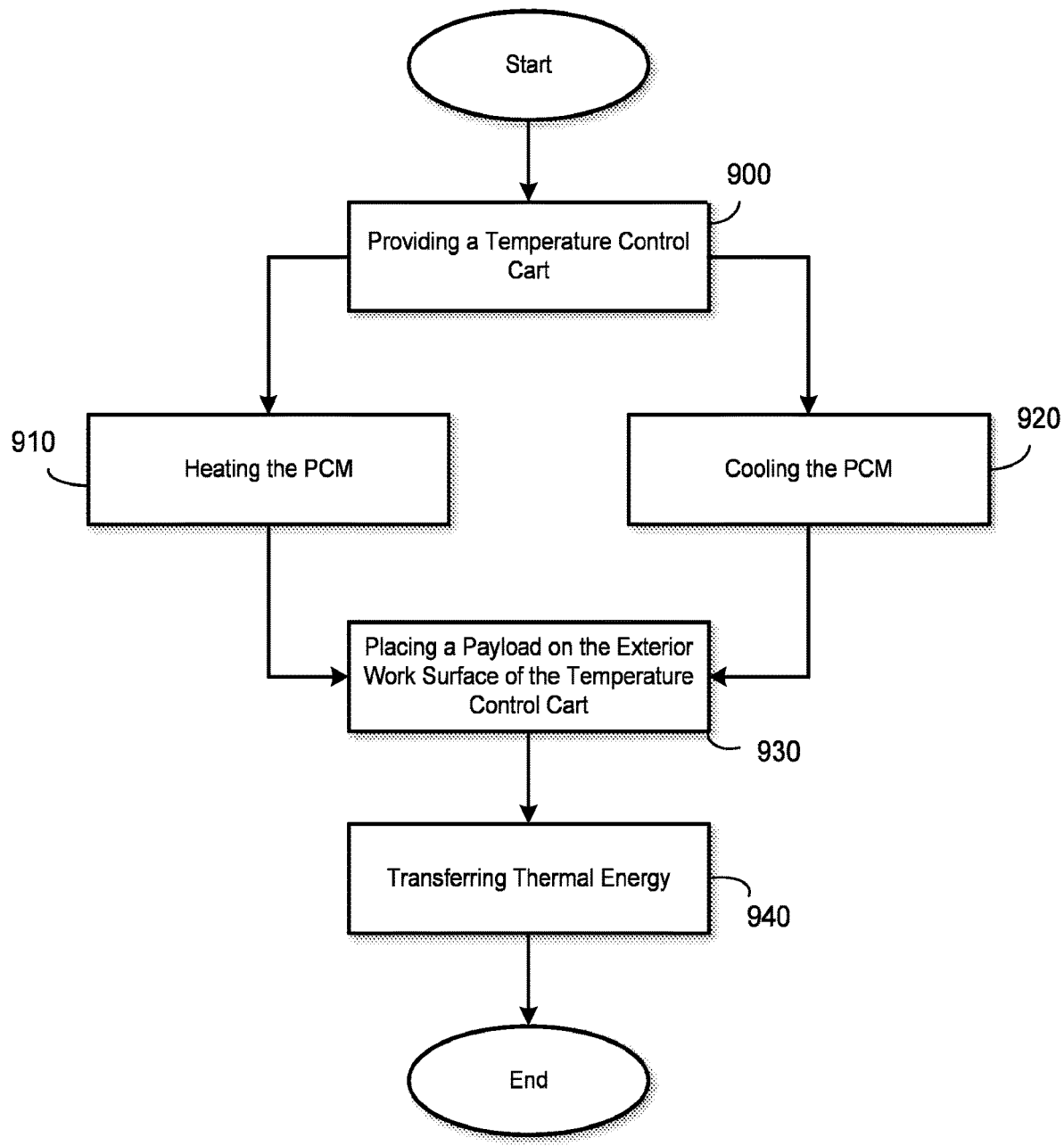
FIG. 9 is a flow chart for an example method of using a temperature control cart.

Referring now to FIG. 9, a flow chart of an example method of using a temperature control cart. In the example, we start by providing a temperature control cart (900), wherein the temperature control cart comprises a frame, a tank with PCM disposed, wells, and pans. Next, heating (910) or cooling (920) the PCM disposed within the interior volume of the tank equipped or configured on the temperature control cart. Heating or cooling may occur through various means as previously discussed including passive and mechanical means. Next, placing a payload, such as food or beverage, and or medicine, on the exterior work surface of the temperature control cart (930). In one example, the pans have food placed within the concave structure, the pans are in metal to metal surface contact with the wells, the pans may also have a layer of water disposed between, or other fluid, between the pans and wells. In another example, the pans form enclosures wherein vaccines, or other medicine such as insulin that requires temperature control. Further, in other examples, long term temperature control stabilization for medicines is configured with the temperature control cart. Next, the wells are in contact with the PCM disposed within the interior of the tank on the temperature control cart. Thereby transferring thermal energy (940) to and from the PCM and the payload within the pans. In other embodiments the exterior work surface is a flat surface, with similar contact through the top portion to the PCM disposed within the tank of the temperature control cart. In the example of a medical temperature control cart, the top surface or working surface may be heated or cooled as per requirements for administration of the medicine. In one example, a cooled vaccine is warmed on the working surface of the temperature control cart to the desired temperature for administration of the vaccine to a patient.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

IV. Embodiments Certain implementations of systems, apparatus, and methods consistent with the present disclosure are provided as follows.

Embodiment 1. A temperature control cart, comprising:
a top portion comprising one or more wells operable to receive one or more pans;
a tank disposed beneath the top portion; and
a phase change material (PCM) disposed in the tank.

Embodiment 2. The temperature control cart of embodiment 1, further comprising one or more heat exchangers disposed in the PCM in the tank.

Embodiment 3. The temperature control cart of embodiment 1, further comprising a frame supporting and/or containing the tank and the top portion.

Embodiment 4. The temperature control cart of embodiment 1, further comprising one or more thermal exchange conduits disposed within the frame or within side walls of the tank.

Embodiment 5. The temperature control cart of embodiment 1, further comprising a circulation pump for circulating a heat exchange fluid within the thermal exchange conduits.

Embodiment 6. The temperature control cart of embodiment 1, further comprising a refrigeration or heating unit for heating or cooling a heat exchange fluid, wherein the PCM is in thermal contact with the one or more wells of the top portion.

Embodiment 7. The temperature control cart of embodiment 1, wherein there is no water or ice disposed in the wells beneath the pans.

Embodiment 8. The temperature control cart of embodiment 1, wherein the PCM is not ice.

Embodiment 9. The temperature control cart of embodiments 1, 4, and 5, wherein the circulation pump is disposed beneath the tank.

Embodiment 10. The temperature control cart of embodiments 1, 3, 4, and 6, wherein the refrigeration or heating unit is mechanically supported by the top portion, the tank, or, if present, the frame of the cart.

Embodiment 11. The temperature control cart of embodiments 1, 3, 4, and 6, wherein the refrigeration or heating unit is not mechanically supported by the top portion, the tank, or, if present, the frame of the cart.

Embodiment 12. A method of controlling temperature of a payload, comprising:
providing the temperature control cart of embodiment 1;
heating or cooling the PCM of the temperature control cart above or below a phase transition temperature of the PCM; and
placing a payload on an exterior work surface of the temperature control cart.

Embodiment 13. The method of embodiment 12, further comprising transferring thermal energy from the payload to the PCM or from the PCM to the payload, thereby controlling the temperature of the payload.

Embodiment 14. The method of embodiment 12, further comprising providing one or more heat exchangers disposed within the tank on the temperature control cart.

Embodiment 15. The method of embodiment 12, wherein heating or cooling the PCM of the temperature control cart comprises a heating unit applying heat to a heat exchange fluid or a refrigeration unit applying cooling to a heat exchange fluid.

Embodiment 16. The method of embodiment 12, wherein heating or cooling the PCM of the temperature control cart further comprises circulating a heat exchange fluid within a thermal exchange conduit on the temperature control cart.

Embodiment 17. The method of embodiment 12, wherein placing the payload on an exterior work surface of the temperature control cart places the payload in the one or more wells on the temperature control cart.

Embodiment 18. The method of embodiment 12, further comprising placing serving dishes on an exterior surface of the temperature control cart.

Embodiment 19. The method of embodiment 12, wherein heating or cooling the PCM of the temperature control cart above or below a phase transition temperature of the PCM, comprises a phase transition temperature range of −80° C. to −60° C.

Embodiment 20. The method of embodiment 12, wherein heating or cooling the PCM of the temperature control cart above or below a phase transition temperature of the PCM, comprises a phase transition temperature range of −60° C. to −40° C.

Embodiment 21. The method of embodiment 12, wherein heating or cooling the PCM of the temperature control cart above or below a phase transition temperature of the PCM, comprises a phase transition temperature range of −40° C. to −20° C.

Embodiment 22. The method of embodiment 12, wherein heating or cooling the PCM of the temperature control cart above or below a phase transition temperature of the PCM comprises a phase transition temperature range of −30° C. to −10° C.

Embodiment 23. The method of embodiment 12, wherein heating or cooling the PCM of the temperature control cart above or below a phase transition temperature of the PCM, comprises a phase transition temperature range of −10° C. to 0° C.

Embodiment 24. The method of embodiment 12, wherein heating or cooling the PCM of the temperature control cart above or below a phase transition temperature of the PCM, comprises a phase transition temperature range of 0° C. to 5° C.

Embodiment 25. The method of embodiment 12, wherein heating or cooling the PCM of the temperature control cart above or below a phase transition temperature of the PCM, comprises a phase transition temperature range of 0° C. to 10° C.

Embodiment 26. The method of embodiment 12, wherein heating or cooling the PCM of the temperature control cart above or below a phase transition temperature of the PCM, comprises a phase transition temperature range of 2° C. to 8° C.

Embodiment 27. The method of embodiment 12, wherein heating or cooling the PCM of the temperature control cart above or below a phase transition temperature of the PCM, comprises a phase transition temperature range of 40° C. to 60° C.

Embodiment 28. The method of embodiment 12, wherein heating or cooling the PCM of the temperature control cart above or below a phase transition temperature of the PCM, comprises heating or cooling and/or maintaining the PCM by use of liquid nitrogen.

Therefore, the following is claimed:
1. A temperature control cart, comprising:
(a) a top portion comprising wells within each of which a pan is received for heat transfer therebetween; and (b) a tank located beneath the top portion and having an interior volume filled with a phase change material (PCM) and with plate heat exchangers disposed in the PCM;

(c) wherein the wells of the top portion extend into the interior volume of the tank and are immersed such that the PCM is in thermal contact with the wells for heat transfer therebetween, whereby heat transfer occurs between the PCM and the pans through the wells.

2. The temperature control cart of claim 1, wherein the plate heat exchangers comprise a stack of spaced apart heat exchange plates.

3. The temperature control cart of claim 1, further comprising a cooling unit and a circulation pump for circulating a heat exchange fluid between the plate heat exchangers and the cooling unit.

4. The temperature control cart of claim 3, wherein the circulation pump is located beneath the tank.

5. The temperature control cart of claim 1, further comprising a heating unit and a circulation pump for circulating a heat exchange fluid between the plate heat exchangers and the heating unit.

6. The temperature control cart of claim 5, wherein the circulation pump is located beneath the tank.

7. The temperature control cart of claim 1, wherein each pan is received in thermal contact by a respective well.

8. The temperature control cart of claim 7, wherein each pan is in metal-to-metal surface contact with the well within which it is received.

9. The temperature control cart of claim 1, wherein each well contains a fluid for effecting heat transfer between the well and the pan received therein.

10. The temperature control cart of claim 9, wherein the fluid is water.

11. The temperature control cart of claim 1, wherein the top portion is removable from the tank and interchangeable with another top portion.

12. The temperature control cart of claim 1, wherein the tank is removable from the cart and interchangeable with another tank.

13. The temperature control cart of claim 1, wherein the temperature control cart is not configured for active heating or active cooling of the PCM in the tank.

* * * * *